United States Patent
Takebayashi et al.

(10) Patent No.: US 6,676,132 B1
(45) Date of Patent: Jan. 13, 2004

(54) SEAL AND ROTARY ASSEMBLY USING THE SEAL

(75) Inventors: Hiroaki Takebayashi, Osaka (JP); Kazunori Hayashida, Osaka (JP); Kazutoshi Yamamoto, Osaka (JP); Yoshiki Fujii, Osaka (JP); Shinichi Ohbayashi, Tokushima (JP); Yishihiro Yano, Tokushima (JP)

(73) Assignees: Kojo Seiko Co., Ltd., Osaka (JP); Teijin Seiki Co., Ltd., Tokyo (JP)

( * ) Notice: Subject to any disclaimer, the term of this patent is extended or adjusted under 35 U.S.C. 154(b) by 0 days.

(21) Appl. No.: 09/856,605

(22) PCT Filed: Sep. 27, 2000

(86) PCT No.: PCT/JP00/06681

§ 371 (c)(1),
(2), (4) Date: May 23, 2001

(87) PCT Pub. No.: WO01/23789

PCT Pub. Date: Apr. 5, 2001

(30) Foreign Application Priority Data

| Sep. 27, 1999 | (JP) | P11-272194 |
| Sep. 27, 1999 | (JP) | P11-272195 |
| Sep. 27, 1999 | (JP) | P11-272196 |
| Sep. 27, 1999 | (JP) | P11-272197 |
| Dec. 2, 1999 | (JP) | P11-342858 |
| Dec. 2, 1999 | (JP) | P11-342859 |

(51) Int. Cl.$^7$ .............................. F16J 15/32
(52) U.S. Cl. ............ 277/560; 277/549; 277/562; 277/563; 277/570

(58) Field of Search ................ 277/500, 549, 277/560, 562, 563, 576

(56) References Cited

U.S. PATENT DOCUMENTS

| 4,155,560 | A | * | 5/1979 | Repella | 277/309 |
| 4,239,243 | A | * | 12/1980 | Bainard et al. | 277/559 |
| 5,895,052 | A | * | 4/1999 | Drucktenhengst et al. | 277/351 |
| 6,102,409 | A | * | 8/2000 | Furuyama et al. | 277/559 |
| 6,199,869 | B1 | * | 3/2001 | Furuyama et al. | 277/559 |
| 6,315,296 | B1 | * | 11/2001 | Oldenburg | 277/353 |
| 6,322,082 | B1 | * | 11/2001 | Paykin | 277/549 |

* cited by examiner

Primary Examiner—Anthony Knight
Assistant Examiner—E Peavey
(74) Attorney, Agent, or Firm—Jordan and Hamburg LLP

(57) ABSTRACT

The object of the present invention is to improve sealing performance of a seal under a specific environment. The seal is arranged in an annular space A in which a rotary shaft 1 and a housing 2 face each other, and partitions the annular space in axial direction into a vacuum space B and an atmospheric pressure space C. The seal is constituted such that a main lip 6 of the seal has an axial contact width W0 with which the main lip slides on and contacts with the rotary shaft 1 and which is set to be equal to or larger than an axial contact width W1 necessary to secure minimum sealing performance with respect to a sealed portion and equal to or smaller than an axial contact width W2 with which sliding resistance against the rotary shaft becomes a permissible upper limit, to thereby prevent the axial contact width W0 from influencing rotation characteristics with respect to the rotary member and to allow securing required sealing performance.

23 Claims, 24 Drawing Sheets

F I G. 13
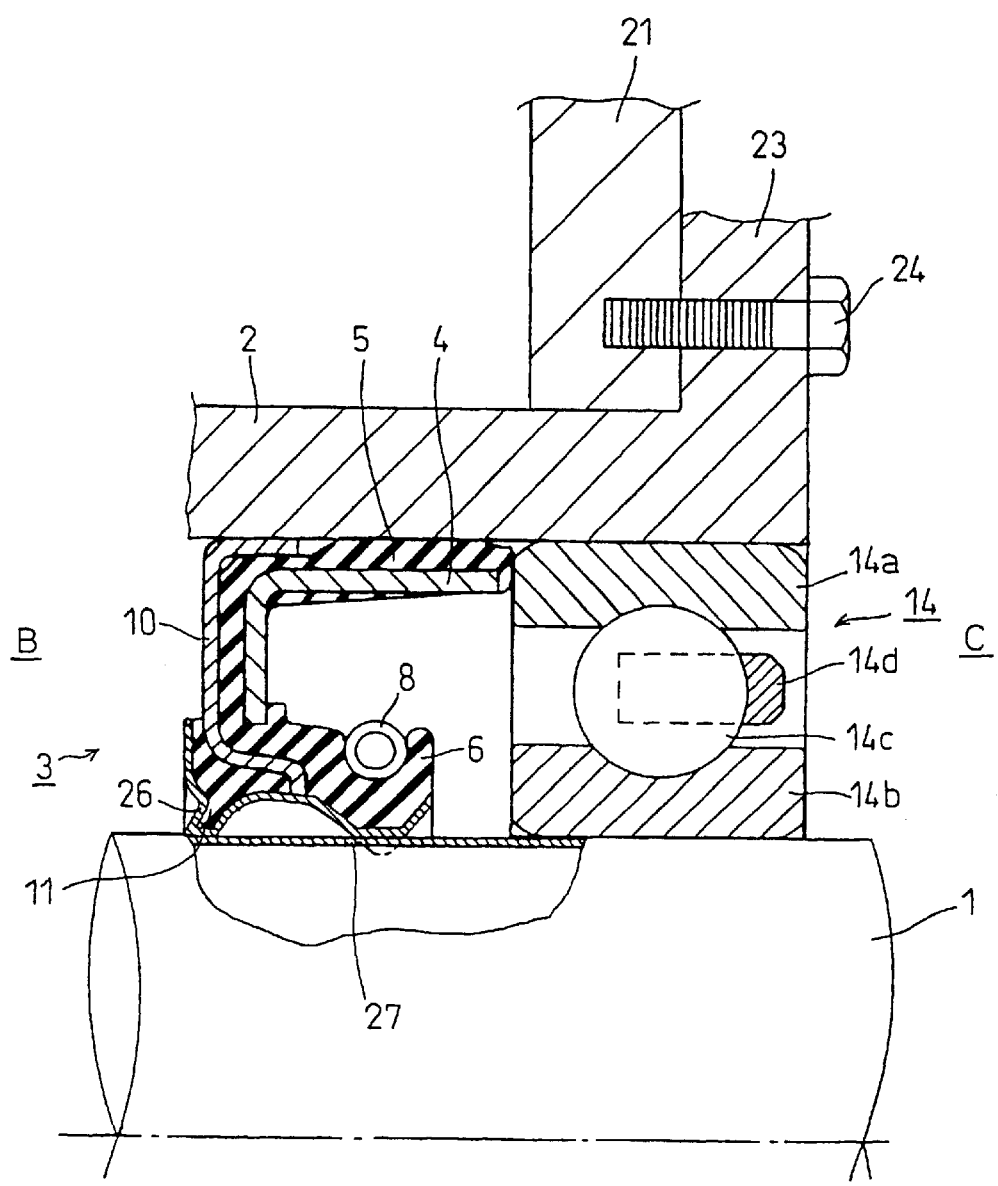

F I G. 17
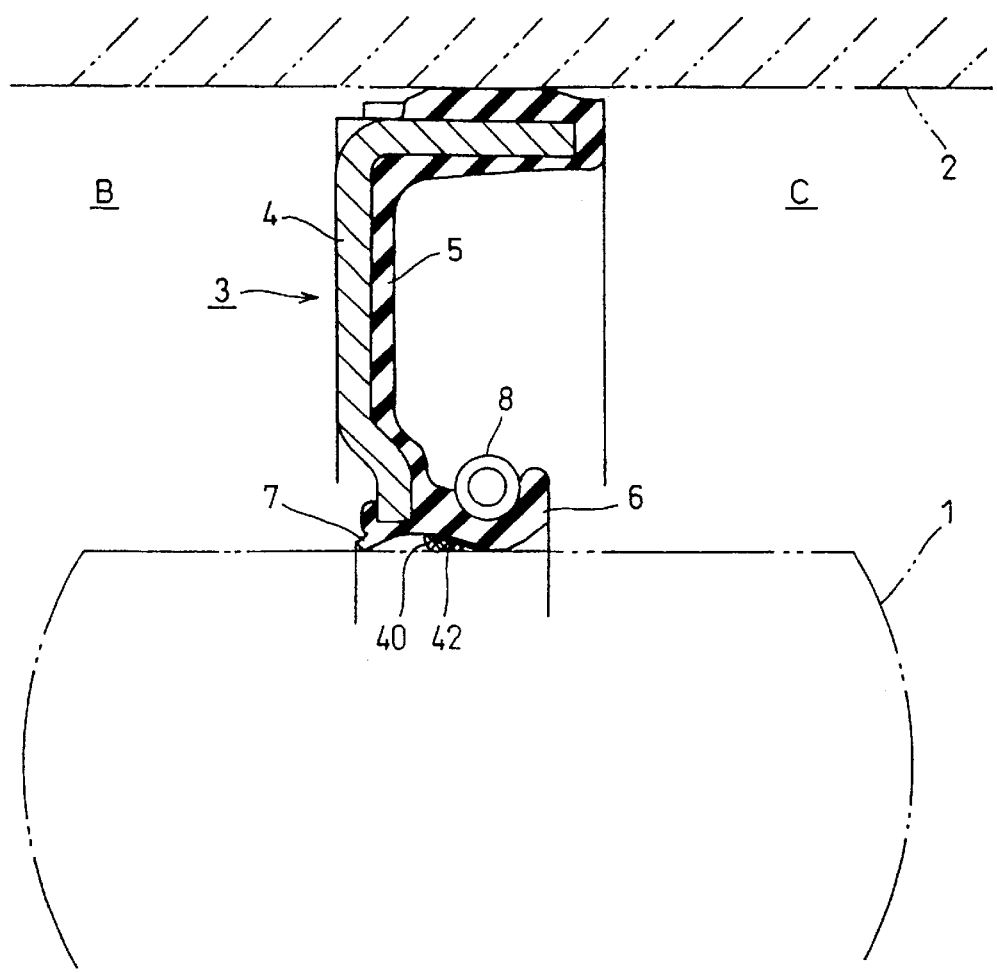

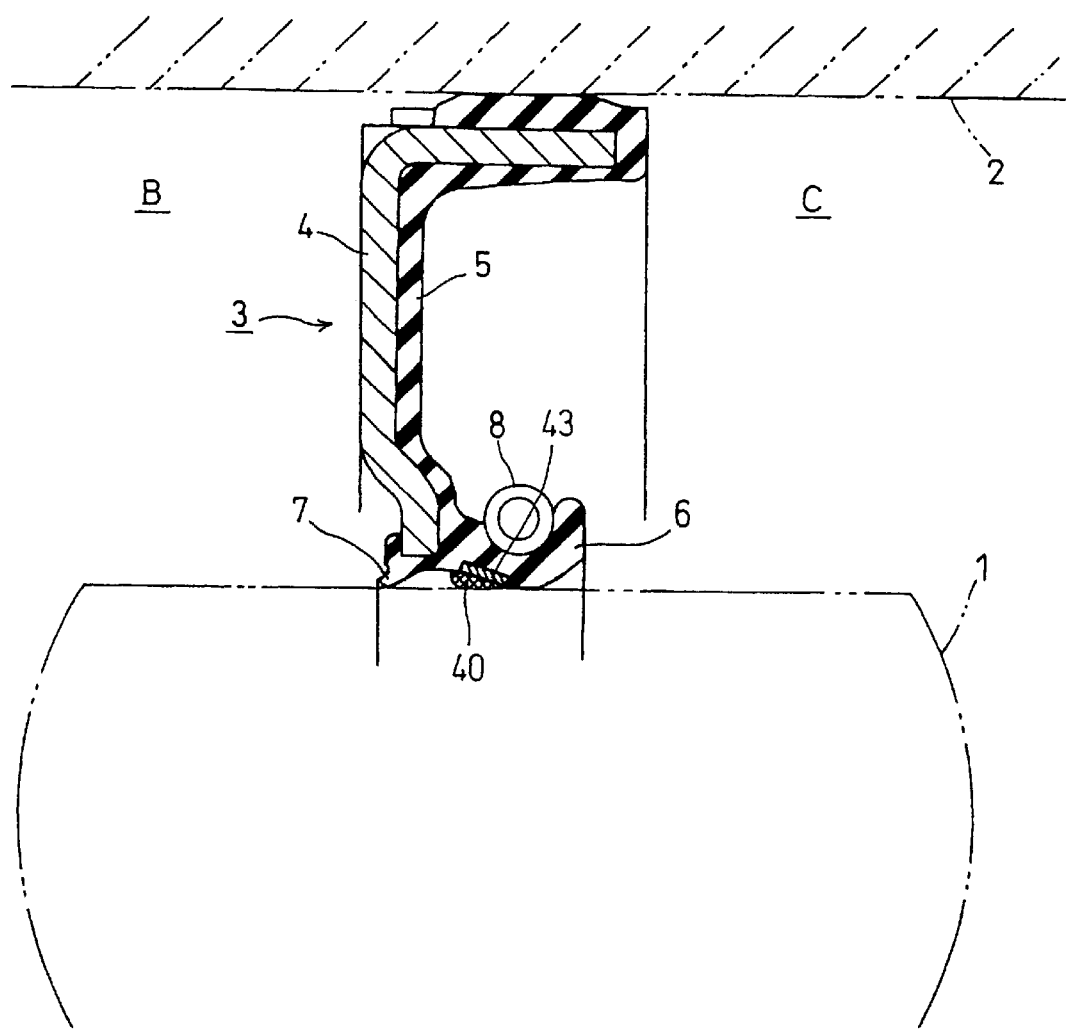
F I G.18

F I G. 19
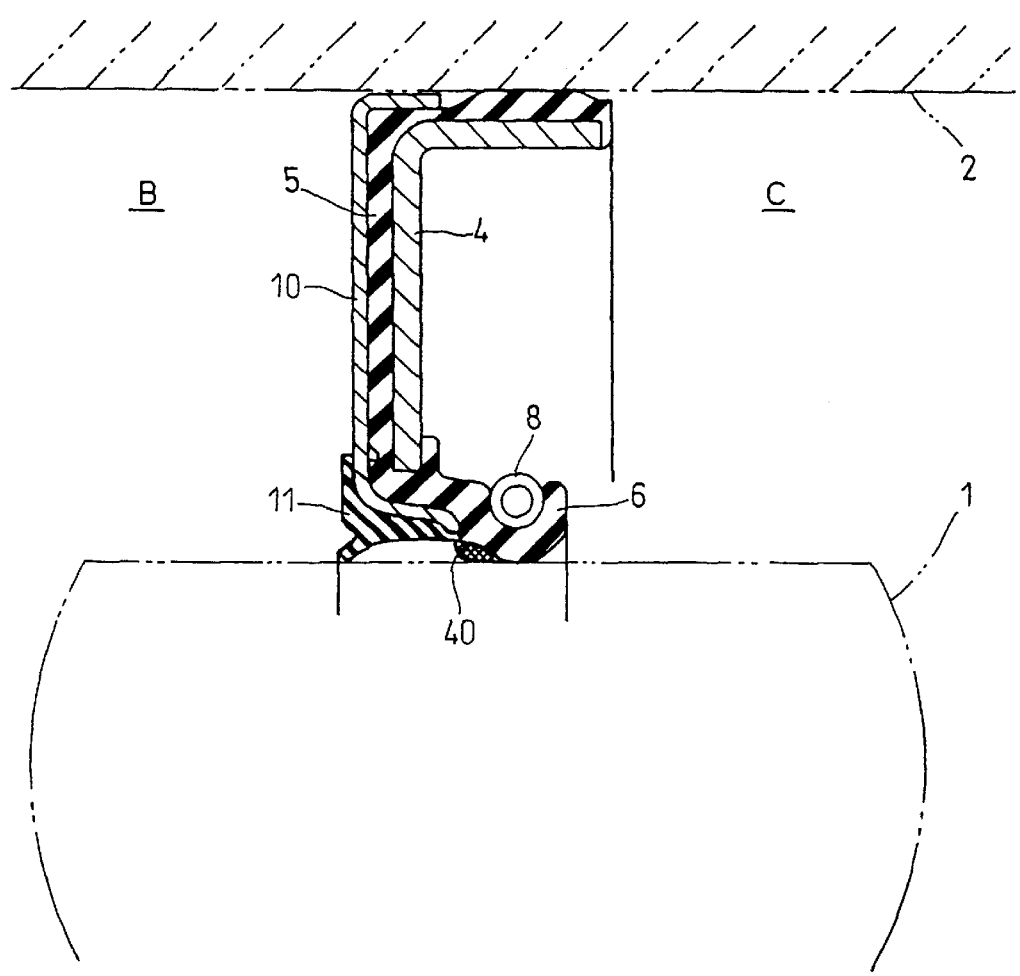

F I G. 24
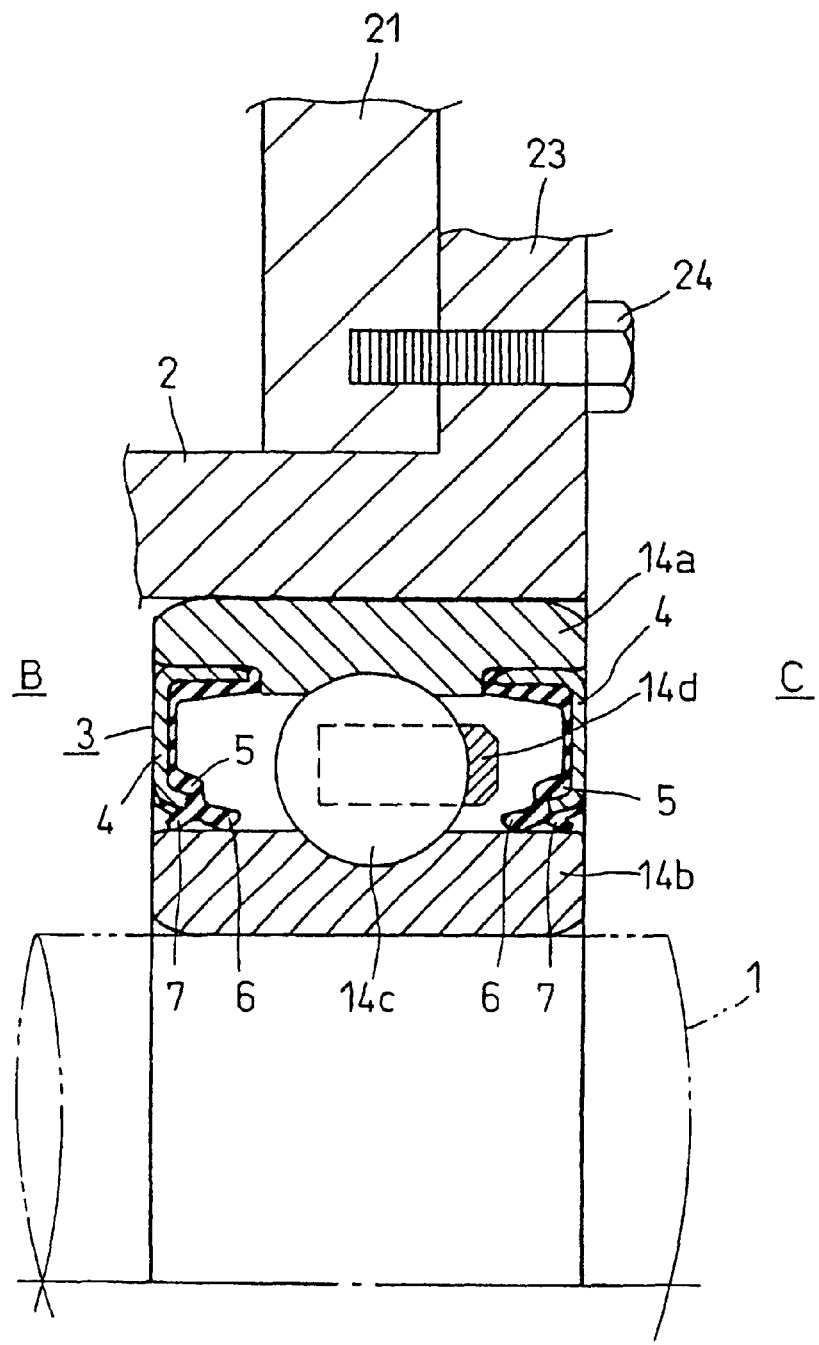

F I G . 25
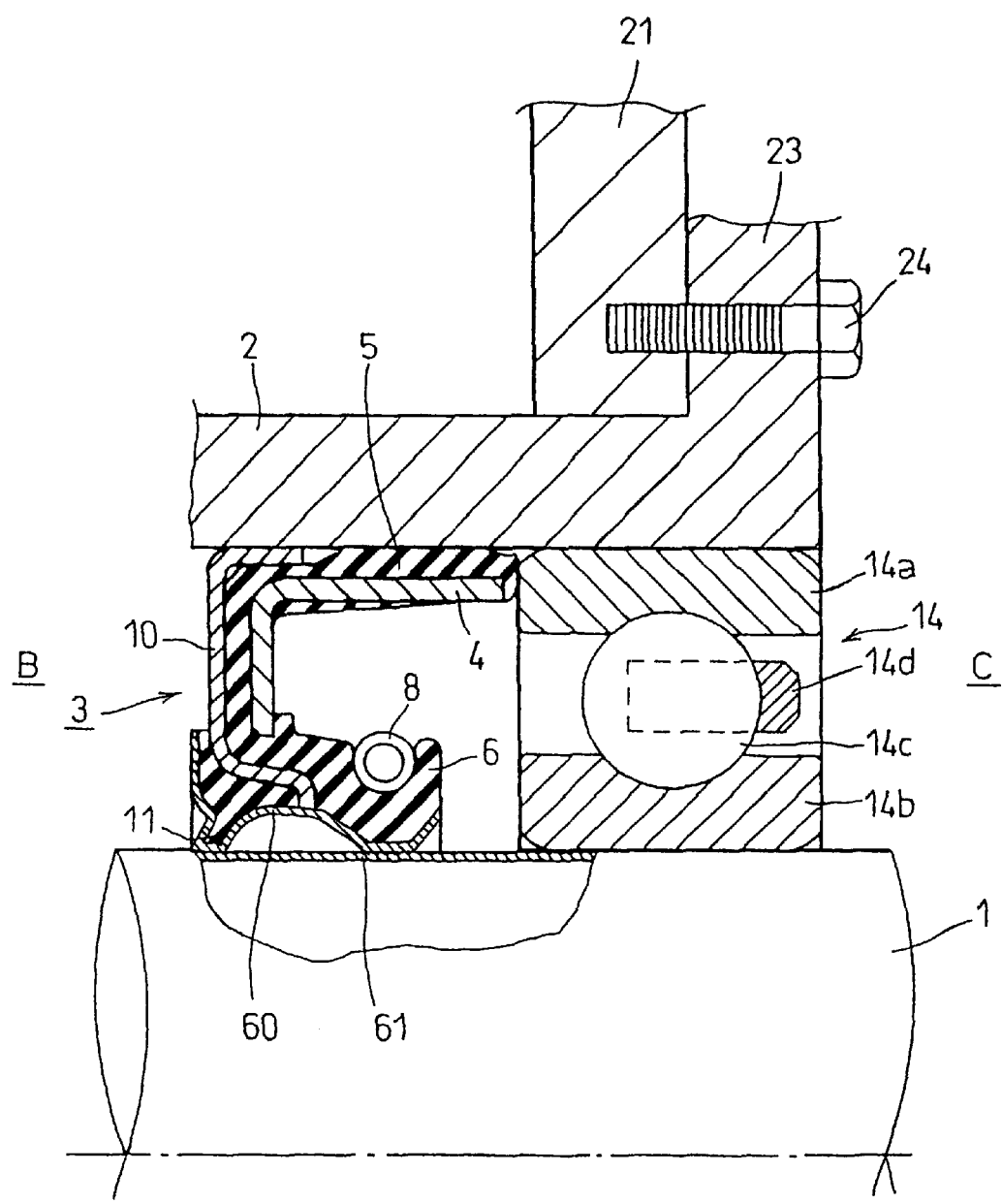

SEAL AND ROTARY ASSEMBLY USING THE SEAL

DETAILED DESCRIPTION OF THE INVENTION

1. Background of the Invention

The present invention relates to a seal which is arranged in an annular space, in which two members face each other, the two members are provided concentrically inside and outside of the space in diameter direction and which partitions the annular space into two spaces, i.e., a low pressure space and a high pressure space having a higher pressure than that of the low pressure space in axial direction, and also relates to a rotational assembly using the seal.

2. Description of Related Art

A seal which partitions a space into two spaces and seals one space from the other space is provided as a lip having an elastic element coated on an annular core metal and sliding the inner peripheral portion of the elastic element on a rotary member. A clearance between the lip and the rotary member is made a sealed portion by the seal and the leakage of oil from the clearance is thereby prevented. If such a seal is used to partition a space into a vacuum space and an atmospheric pressure space, the sealing performance of the seal is disadvantageously uneven despite the fact that the shape of the lip is the same.

After having been devoted to the intensive studies of the causes of unevenness in sealing performance, the inventors of the present invention made the following discoveries. If the axial contact width between the lip and the rotary member is larger and the sliding pressure of the lip with respect to the rotary member is higher, the sealing performance of the above-stated sealed portion is more improved.

On the other hand, if the axial contact width is larger and the sliding pressure is higher, the sliding resistance of the lip with respect to the rotary member is higher, which is unfavorable for the rotation characteristics of the rotary member. In view of this, the lip shape of a conventional seal is set such that the cross-sectional shape of the upper half of the lip is, for example, an inverse triangle having sharp edges, so as to make the axial contact width of the lip with respect to the rotary member as small as possible and to increase the sliding pressure of the lip as high as possible to thereby improve the sealing performance of the seal and so as to reduce the overall sliding resistance of the lip to thereby improve the rotation characteristics of the rotary member.

However, in case of the lip shaped as stated above, the range of the axial contact width of the lip is not specified. Due to this, it is impossible to make both the axial contact width and the sliding pressure constant because of the difference in production accuracy or in the material of the seal and it is difficult to manage the sealing performance of the seal while reducing the sliding resistance of the lip. As a result, the sealing performance becomes disadvantageously uneven.

As the above-stated seal, an oil seal has been conventionally used. In case of the oil seal, the material of the lip is ordinary rubber such as nitrile rubber, acrylic rubber or silicon rubber. Under the above-stated specific environment, therefore, inside gas or the like easily permeates into the lip itself due to the large difference in pressure between a sealing target space and an atmospheric pressure space, thereby disadvantageously deteriorating the sealing performance of the seal.

It is, therefore, an object of the present invention to provide a seal capable of managing the axial contact width between the a lip and one member to fall within a predetermined range to thereby manage sliding resistance to fall within a predetermined range and also capable of securing required sealing performance.

It is another object of the present invention to provide a seal capable of preventing gas from permeating into a lip itself under the specific environment as stated above and providing more improved sealing performance with respect to a sealing target space.

The other objects, features, advantages and the like of the present invention will be readily apparent from the following description.

DISCLOSURE OF THE INVENTION

A seal according to the present invention is constituted so that the axial contact width of a lip with respect to a rotary member falls within a range equal to or larger than a width necessary to secure minimum sealing performance with respect to the sealed portion and equal to or smaller than a width with which sliding resistance against the rotary member becomes a permissible upper limit, to thereby prevent the axial contact width from influencing rotation characteristics of the rotary member and to allow securing required sealing performance.

According to the present invention, if partitioning a space into a low pressure space having pressure of $10^{-4}$ Pa or lower and an atmospheric pressure space, the axial contact width W0 of the lip with respect to the rotary member is specified to fall within the range of 0.2 mm$\leq$W0$\leq$2.0 mm, to thereby prevent the axial contact width from influencing the rotation characteristics of the rotary member from more practical viewpoints and to allow securing the required sealing performance.

According to the present invention, the cross-sectional shape of the upper half of the lip is preferably a generally triangular shape directed toward a rotary member side, having the axial contact width gradually reduced and having an inside diameter-side vertex portion formed to be round. In that case, it is possible to ensure changing the axial contact width of the lip with respect to the rotary member to an axial contact width within the above-stated range when the lip slides on and contacts with the rotary member.

According to the present invention, the cross-sectional shape of the upper half of the lip is preferably a generally triangular shape directed toward the rotary member side and having the axial contact width gradually reduced and the lip is preferably bent from a root side to an inside diameter side. By doing so, if the slant face of the low pressure space-side lip contacts with the rotary member and the lip slides on and contacts with the rotary member, it is possible to ensure changing the axial contact width of the lip with respect to the rotary member to an axial contact width within the above-stated range.

According to the present invention, the interference of the lip with respect to the rotary member is preferably managed to hold the above-stated axial contact width. If so, it is possible to eliminate the influence on the rotation characteristics and to secure sealing performance more surely.

According to the present invention, the fastening force of the lip with respect to the rotary member is preferably managed to hold the above-stated axial contact width. If so, it is possible to eliminate the influence on the rotation characteristics and to secure sealing performance more surely.

According to the present invention a material having nitrogen gas permeability equal to or lower than a predetermined value is preferably selected as the material of the lip. If so, it is possible to prevent gas from penetrating into the lip itself toward the sealing target space side which is the low pressure space.

According to the present invention, the lip is preferably constituted out of a material having nitrogen gas permeability equal to or lower than 3.225 ($cm^3/m^2/25 \mu m/24 h/25°$ C. atm). In that case, the seal can exhibit sealing performance even if the pressure of the low pressure space is equal to or lower than $10^{-4}$ Pa and the seal can maintain the low pressure space having pressure of $10^{-4}$ Pa or lower.

BRIEF DESCRIPTION OF THE DRAWINGS

FIG. 13 is an enlarged cross-sectional view of important parts including the seal shown in FIG. 12;

FIG. 17 is a longitudinal sectional view of the upper half of a seal showing another modification of a magnetization section according to Embodiment 16 of the present invention, which view corresponds to FIG. 15;

FIG. 18 is a longitudinal sectional view of the upper half of a seal according to Embodiment 17 of the present invention;

FIG. 19 is a longitudinal sectional view of the upper half of a seal according to Embodiment 18 of the present invention;

FIG. 24 is an enlarged, longitudinal sectional view of the upper half of another modification of a rolling bearing in a bearing unit according to Embodiment 23 of the present invention;

FIG. 25 is an enlarged, longitudinal sectional view of the upper half of yet another modification of a bearing unit according to Embodiment 24 of the present invention.

BEST MODE FOR WORKING THE INVENTION

The best mode for working the present invention (to be referred to as "Embodiment 1" hereinafter) will be described with reference to FIGS. 1 and 2. A seal in Embodiment 1 is used to shut off the interior from/to the exterior of a vacuum chamber while, for example, a rotary shaft is provided to penetrate the vacuum chamber. The seal should not be, however, limited to Embodiment 1.

Figure 1:
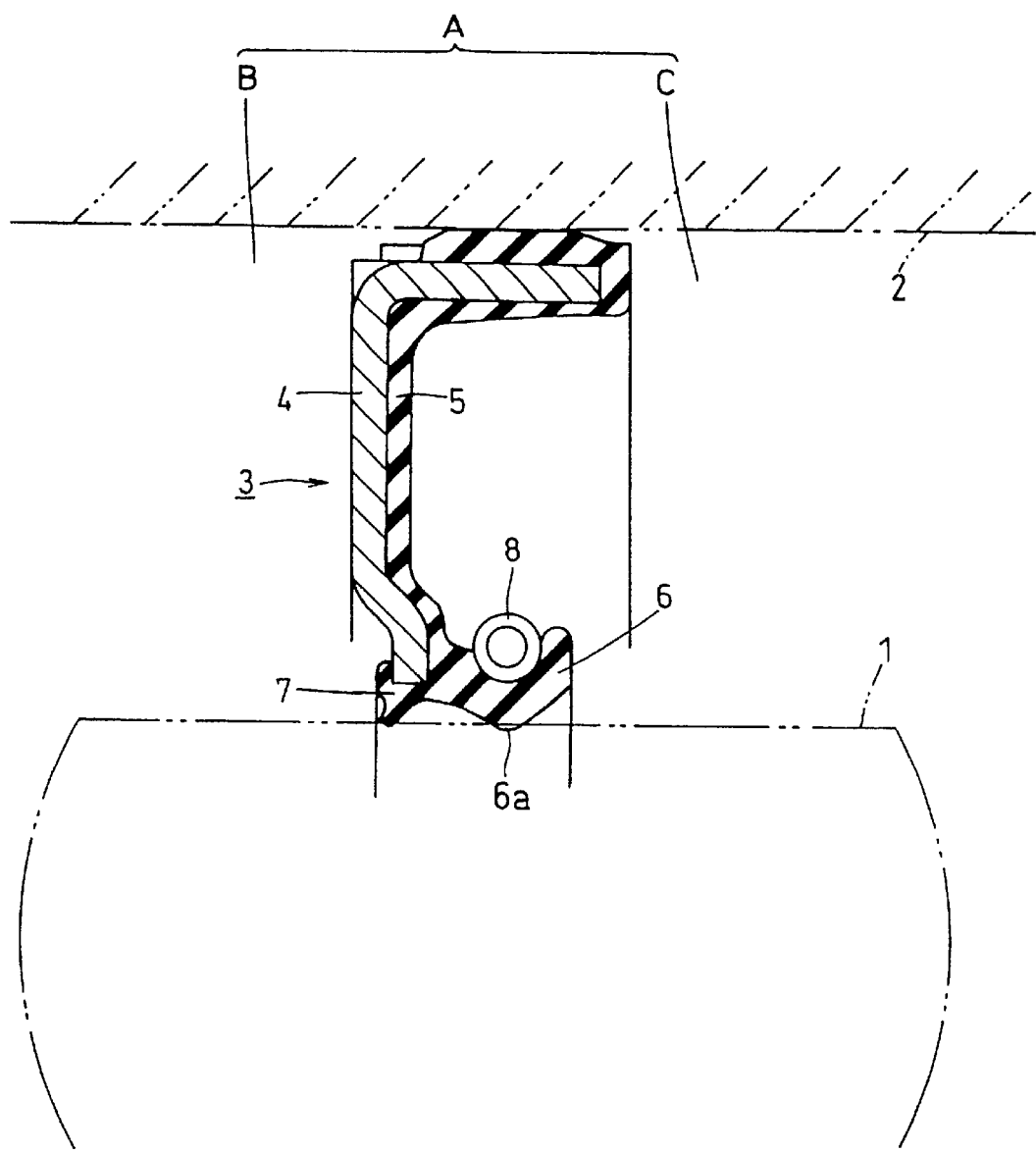
FIG. 1 is a longitudinal sectional view of the upper half of a seal according to Embodiments 1 and 6 of the present invention in a state before a lip slides on a rotary shaft.

FIG. 1 is a longitudinal sectional view of the upper half of a seal in a state before a lip slides on a rotary shaft. FIG. 2 is a longitudinal sectional view of the upper half of the seal in a state in which the lip slides on the rotary shaft. In FIGS. 1 and 2, reference symbol 1 denotes a rotary shaft serving as a rotary member, 2 denotes a housing serving as a fixed member and 3 denotes a seal. The rotary shaft 1 and the housing 2 are concentrically provided in an interior and an exterior in diameter direction, respectively.

An annular space A between the rotary shaft 1 and the housing 2 is axially partitioned by the seal 3 into a low pressure, e.g., vacuum space (or sealing target space) B and a high pressure, e.g., an atmospheric pressure space C higher in pressure than the sealing target space B.

The seal 3 is constituted by annularly coating an elastic element 5 on an annular core metal 4 having a generally L-shaped upper half in cross section in diameter direction.

The inner peripheral portion of the elastic element 5 consists of a main lip 6 extending toward the atmospheric pressure space C side which is one axial side and an auxiliary lip 7 provided adjacent the main lip 6 and formed into a tapered shape having gradually reduced diameter toward the sealing target space B side which is the other axial side.

The inside diameter-side vertex portion 6a of the main lip 6 has a round upper half in cross section as shown in FIG. 1. When the main lip 6 slides on the rotary shaft 1, the main lip 6 contacts with and slides on the rotary shaft 1 to have an axial contact width W0 which satisfies the following relational expression (1) as shown in FIG. 2.

The inside diameter of the main lip 6 is set smaller than the outside diameter of the rotary shaft 1 and has a predetermined interference with respect to the rotary shaft 1.

A garter spring 8 for fastening and press-contacting the main lip 6 to the outer peripheral surface of the rotary shaft 1 is attached to the outer periphery of the main lip 6.

Figure 2:
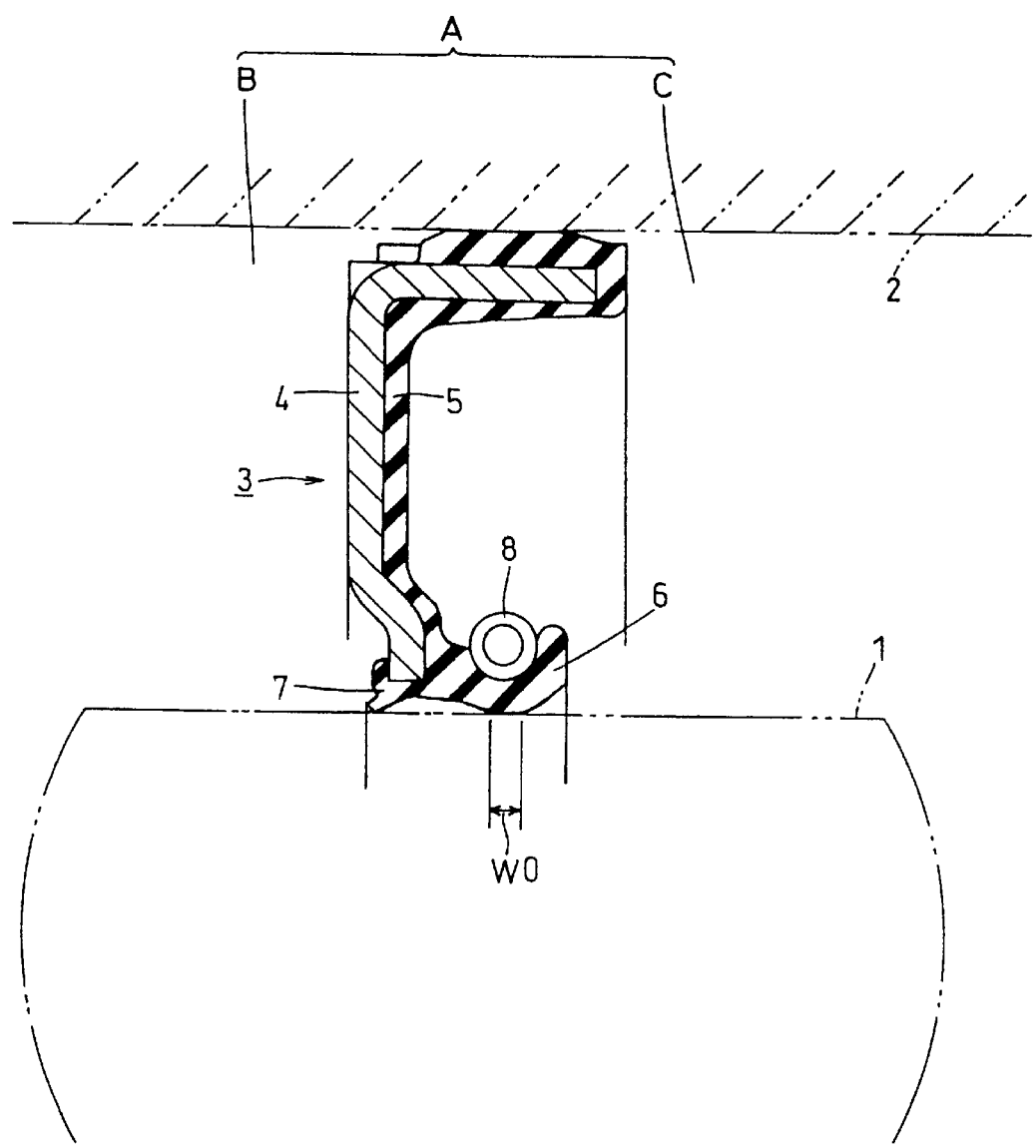
FIG. 2 is a longitudinal sectional view of the upper half of the seal shown in FIG. 1 in a state in which the lip slides on the rotary shaft.

The inside diameter-side vertex portion 6a of the main lip 6 is managed in an auxiliary fashion so that the axial contact width W0 satisfies the following expression (1) with the above-stated interference and the fastening force of the garter spring 8 when the rotary shaft 1 is deformed from the state of FIG. 1 in which the lip 6 does not slide on the rotary shaft 1 to the state of FIG. 2 in which the lip 6 slides on the rotary shaft 1:

$$W1 \leq W0 \leq W2 \qquad (1).$$

In the expression (1), W1 is an axial contact width for sealing which is necessary to secure minimum sealing performance with respect to the clearance (or sealed portion) between the inside diameter-side vertex portion 6a and the rotary shaft 1, and W2 is the axial contact width of the inside diameter-side vertex portion 6a for sliding with which the sliding resistance of the inside diameter-side vertex portion 6a with respect to the rotary shaft 1 is a permissible upper limit.

According to an experiment conducted by the inventors of the present invention, a favorable result was obtained when W1 was 0.2 m and W2 was 2.0 mm.

According to the experiment, if the axial contact width W0 was adjusted by making an adjustment to the fastening force (per unit circumference: g/mm), W2 was adjusted with a fastening force of 70 g/mm and W1 was adjusted with a fastening force of 25 g/mm, then a favorable result was obtained. Accordingly, the fastening force is managed and adjusted to fall within the range of 25 g/mm to 70 g/mm.

Therefore, if the axial contact width W0 is equal to or smaller than the sealing axial contact width W1, the minimum sealing performance of the seal 3 cannot be secured. If equal to or larger than the sliding axial contact width W2, the rotation resistance of the rotary shaft 1 exceeds a permissible limit, with the result that the rotation characteristics of the rotary shaft 1 deteriorates. Namely, if the axial contact width W0 satisfies the expression (1), favorable sealing performance can be secured without adversely influencing the rotation characteristics of the rotary shaft 1.

In this case, it is possible to manage the axial contact width W0 of the inside diameter-side vertex portion 6a to fall within a predetermined range by adjusting the interference of the main lip 6 and the fastening force applied by the garter spring 8 in an auxiliary fashion so that the axial contact width W0 satisfies the relationship of the expression (1) even if material of the main lip 6 varies or the axial contact width W0 of the inside diameter-side vertex portion 6a of the main lip 6 varies due to unevenness in the production accuracy of the main lip 6. By doing so, it is possible to prevent the contact resistance of the rotary shaft 1 from increasing and to secure a necessary axial contact width for the improvement of the sealing performance.

The present invention should not be, however, limited to the seal in the above-stated Embodiment 1. Various modifications and applications to be described hereinafter can be made. In case of the seal according to the present invention, the seal structures in the respective embodiments described below can be added to or combined with the structure of the seal in Embodiment 1.

Figure 3:
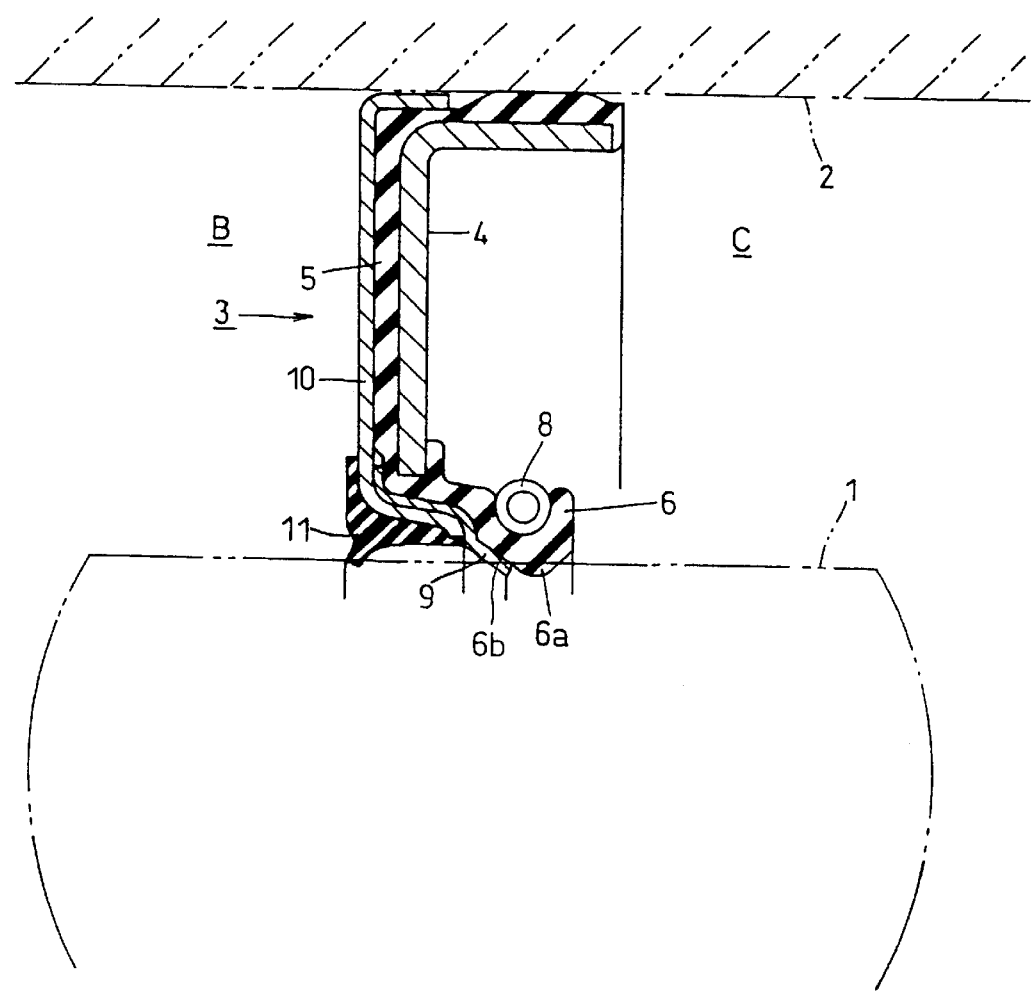
FIG. 3 is a longitudinal sectional view of the upper half of a seal according to Embodiments 2 and 7 of the present invention in a state before a lip slides on a rotary shaft.

(1) FIG. 3 is a longitudinal sectional view of the upper half of a seal 3 according to Embodiment 2 of the present invention in a state before a lip slides on a rotary shaft 1. The longitudinal sectional view of the upper half of the seal 3 in a state in which the lip slides on the rotary shaft 1 is the same as that of FIG. 2 and is not, therefore, shown.

As for the seal 3 in Embodiment 2, the state in which the inside diameter-side vertex portion 6a of a main lip 6 slides on the rotary shaft 1 is not illustrated; however, an axial contact width W0 with respect to the rotary shaft 1 satisfies the relationship represented by the expression (1) and the same function and advantage as those in Embodiment 1 can be obtained.

In Embodiment 2, the seal 3 has a structure in which an annular fluorine-contained resin sheet 9, a metallic annular element 10 and an auxiliary lip 11 separated from an elastic element 5.

The sheet 9 is made of polytetra fluoroethylene (or PTFE such as product name ALP manufactured by STARLITE Co., Ltd.), fluorine-contained synthetic resin having PTFE dispersed and mixed into a resin binder or fluorine-contained resin such as Teflon (product name, manufacturer: Du Pont).

The sheet 9 is provided to be bonded onto the sealing target space B-side slant face 6b of the main lip 6 and pressed by the metallic annular element 10 between the sheet 9 and the main lip 6 to prevent the sheet 9 from peeling off from the main lip 6. The end portion of the sheet 9 in inner peripheral direction is positioned on an outer peripheral side compared to the vertex position of the slant face 6b, i.e., the inside diameter-side vertex portion 6a. Also, the metallic annular element 10 prevents the lips 6 and 11 from being attracted by the negative pressure of the sealing target space B and turned up in the direction of the sealing target space B.

Because of the positional relationship of the sheet 9 with the slant face 6b of the main lip 6, the main lip 6 slides on the rotary shaft 1 and the sheet 9 does not slide while the abrasion of the main lip 6 does not develop. Due to this, at the beginning of sliding, a sealed portion is sealed by the main lip 6.

The posture of the main lip 6 is maintained by the sheet 9 and the main lip 6 can maintain good sealing performance.

Even if the abrasion of the main lip 6 develops due to the sliding of the main lip 6 on the rotary shaft 1, the sheet 9 slides, together with the main lip 6, on the rotary shaft 1. Thus, as a result of sealing by the sheet 9, it is possible to prevent the deterioration of sealing performance due to the development of the abrasion of the main lip 6.

Figure 4:
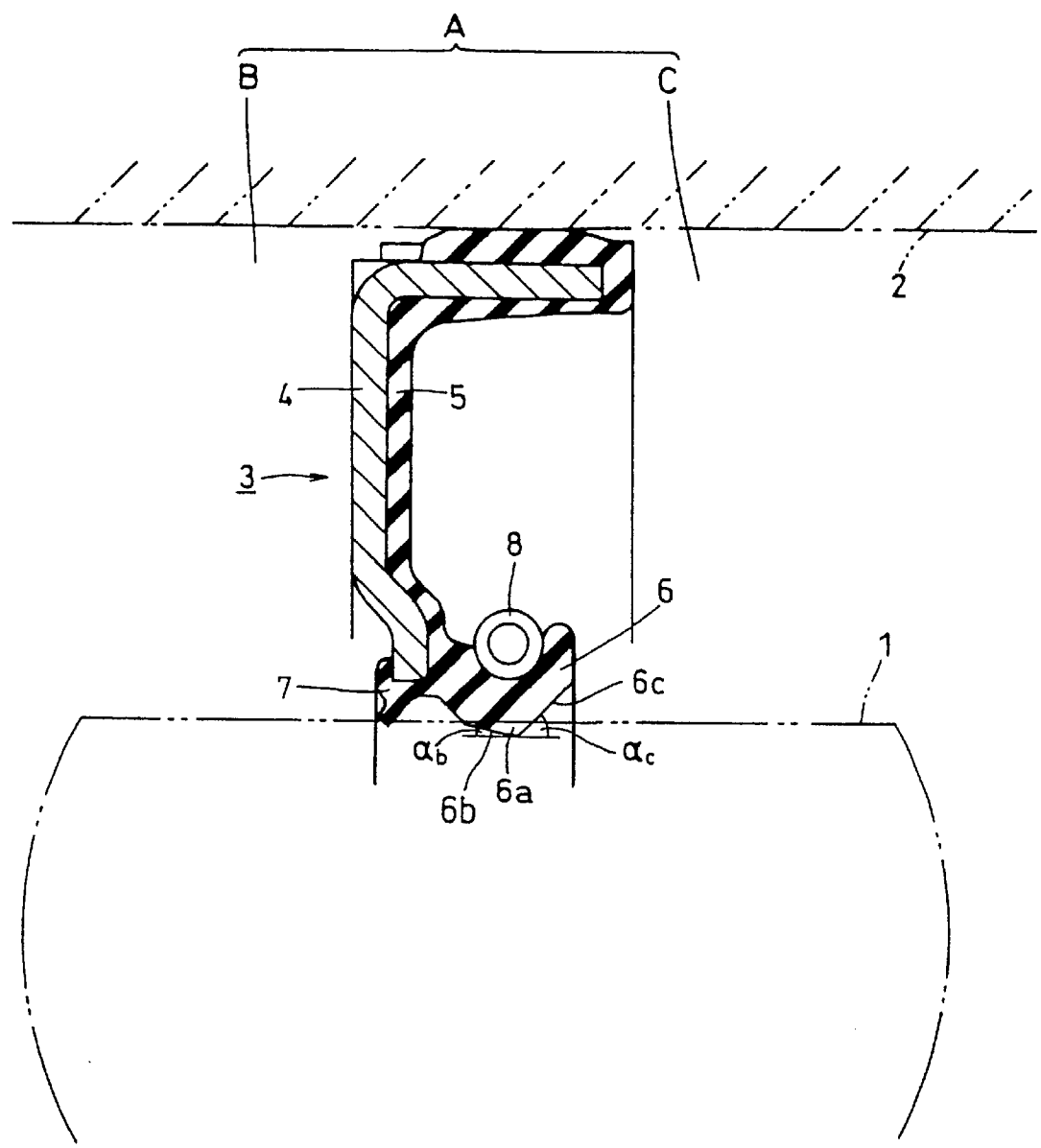
FIG. 4 is a longitudinal sectional view of the upper half of a seal according to Embodiments 3 and 8 of the present invention in a state before a lip slides on a rotary shaft.
Figure 5:
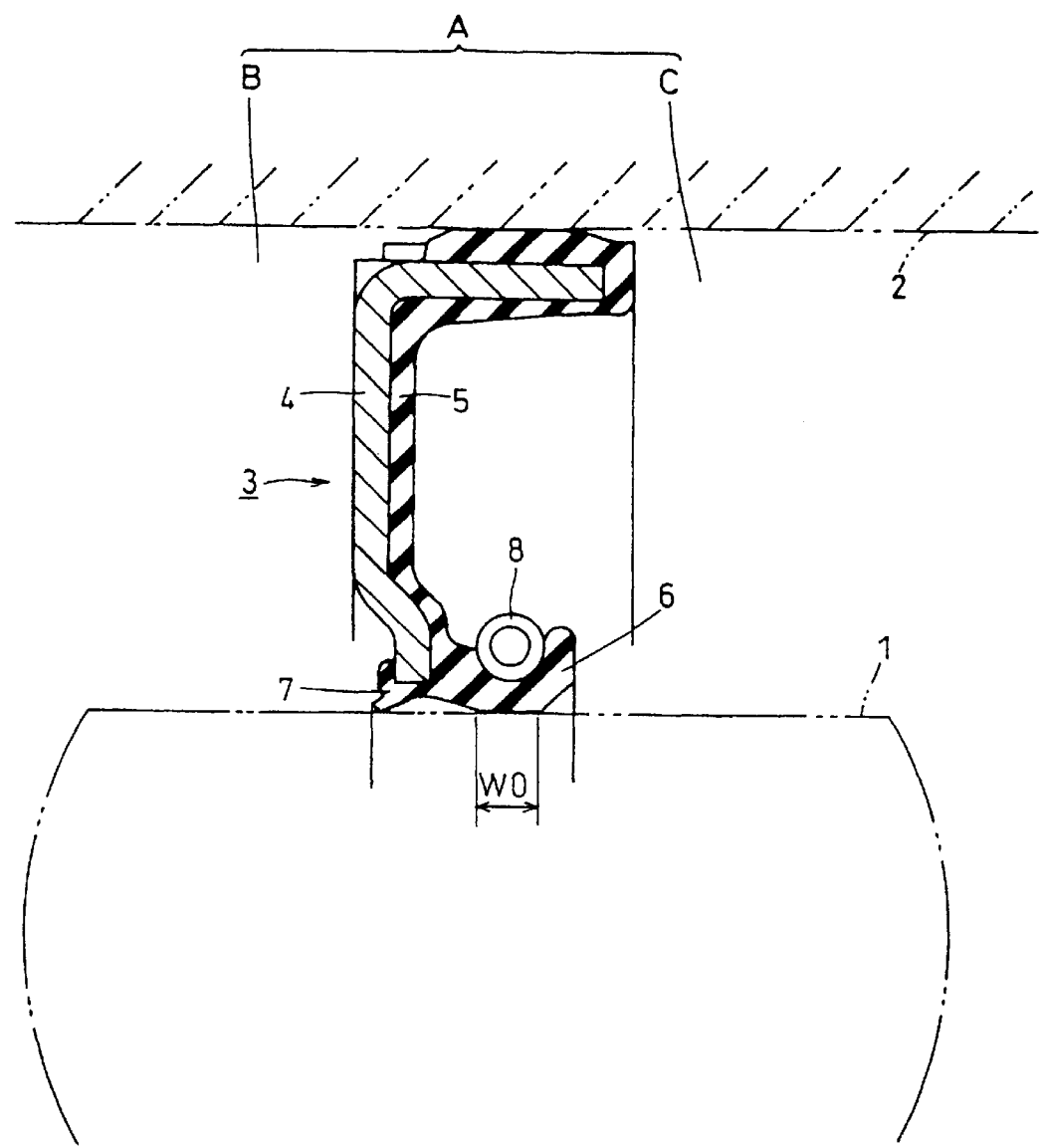
FIG. 5 is a longitudinal sectional view of the upper half of the seal shown in FIG. 4 in a state in which the lip slides on the rotary shaft.

(2) FIGS. 4 and 5 relate to Embodiment 3 of the present invention. FIG. 4 is a longitudinal sectional view of the upper half of a seal 3 in a state before a lip slides on a rotary shaft 1. FIG. 5 is a longitudinal sectional view of the upper half of the seal 3 in a state in which the lip slides on the rotary shaft 1.

In Embodiment 1 shown in FIGS. 1 and 2 and Embodiment 2 shown in FIG. 3, the inside diameter-side vertex portion 6a of the main lip 6 has a round shape in cross section to satisfy the expression (1).

In Embodiment 3, by contrast, the sectional shape of the upper half of a main lip 6 is generally triangle directed toward the rotary shaft 1 side, having a gradually reduced axial contact width and bent from the root side to the inside diameter side. As a result, the slant face 6b of the main lip 6 on the sealing target space B side comes in contact with the rotary shaft 1. Due to this, the main lip 6 satisfies the relationship of slant angle $\alpha_b$<<slant angle $\alpha_c$ if comparing the slant angle $\alpha_b$ with respect to the axial direction of the sealing target space B-side slant face 6b of the main lip 6 to the slant angle $\alpha_c$ with respect to the axial direction of the atmospheric pressure space C-side slant 6c in the state of FIG. 4. In this case, the inside diameter side vertex portion 6a of the main lip 6 is located to be deviated toward the atmospheric pressure C side from the direction in which a fastening force from the garter spring 8 in diameter direction acts on the main lip 6.

As a result, if the main lip 6 contacts with and slides on the rotary shaft 1 as shown in FIG. 5, the main lip 6 rotates counterclockwise and the slant face 6b thereof contacts with and slides on the rotary shaft 1. In this case, the axial contact width W0 satisfies the relationship of the expression (1) stated above by adjusting the fastening force or the like.

Accordingly, in Embodiment 3 as in the case of Embodiments 1 and 2, even if the material of the main lip 6 varies or the axial contact width W0 of the inside diameter-side vertex portion 6a of the main lip 6 varies due to unevenness in the production accuracy of the main lip 6, it is possible to manage the axial contact width W0 of the inside diameter-side vertex portion 6a to fall within a predetermined range by managing and adjusting the interference of the main lip 6 and the fastening force applied by the garter spring 8 so as to satisfy the relationship of the expression (1). By doing so, it is possible to prevent sliding resistance against the rotary shaft 1 from increasing and to secure a necessary axial contact width for the improvement of sealing performance.

Here, the inventors of the present invention conducted studies for the axial contact width W0 of the inside diameter-side vertex portion 6a of the main lip 6 stated above in the above-stated embodiments. As a result, it was discovered that the deterioration of the sealing performance of the seal 3 is one cause for applying excessive pressure difference to the lip under the specific environment stated above, whereby atmospheric pressure space C-side gas permeates into the lip itself in the direction of the sealing target space B side.

Due to this, various types of lip materials were selected and experimented with respect to the pressure difference between the two spaces. As a result, it was confirmed that under the use conditions of (i) below, if a material of (ii) was selected, the permeation of gas into the lip can be effectively prevented and the sealing performance of the seal improved.

(i) Use Conditions a. Pressure of sealing target space: equal to or lower than $10^{-4}$ Pa.
b. Leakage speed of sealing fluid from sealed portion: equal to or later than $10^{-9}$ Pam$^3$/sec.
c. Temperature used: 25° C.

(ii) Lip Material

On the premise that the degree of vacuum is that of the sealing target space B out of the both spaces between which the lip is put under the conditions (i) above, a material having nitrogen gas permeability, which is one of the chemical properties of a plastic film, of 3.225 (cm$^3$/m$^2$/25 $\mu$m/24 h/25° C. atm) or less was selected as the material of the lip according to the present invention. Then, nitrogen gas did not permeate into the lip and the sealing performance of the seal 3 was improved.

From the viewpoint of the improvement of sealing performance under a specific environment, which is one of the objects of the present invention, the material of the lip can be freely selected from those having gas permeability as stated above. However, if a material mainly consisting of one of the following fluorine-contained resins and rubbers, in particular, a favorable result was obtained.

Fluorine-contained Resins

PTFE (tetrafluoroethylene resin)

PFA (tetrafluoroethylene-perfluoroalkyl vinyl ether copolymer resin)

FEP (tetrafluoroethylene-propylene hexafluoride copolymer resin)

ETFE (tetrafluoroethylene-ethylene copolymer resin)

CTFE (trifluorochloroethylene resin)

PVDF (vinylidene fluoride resin)

Figure 6:
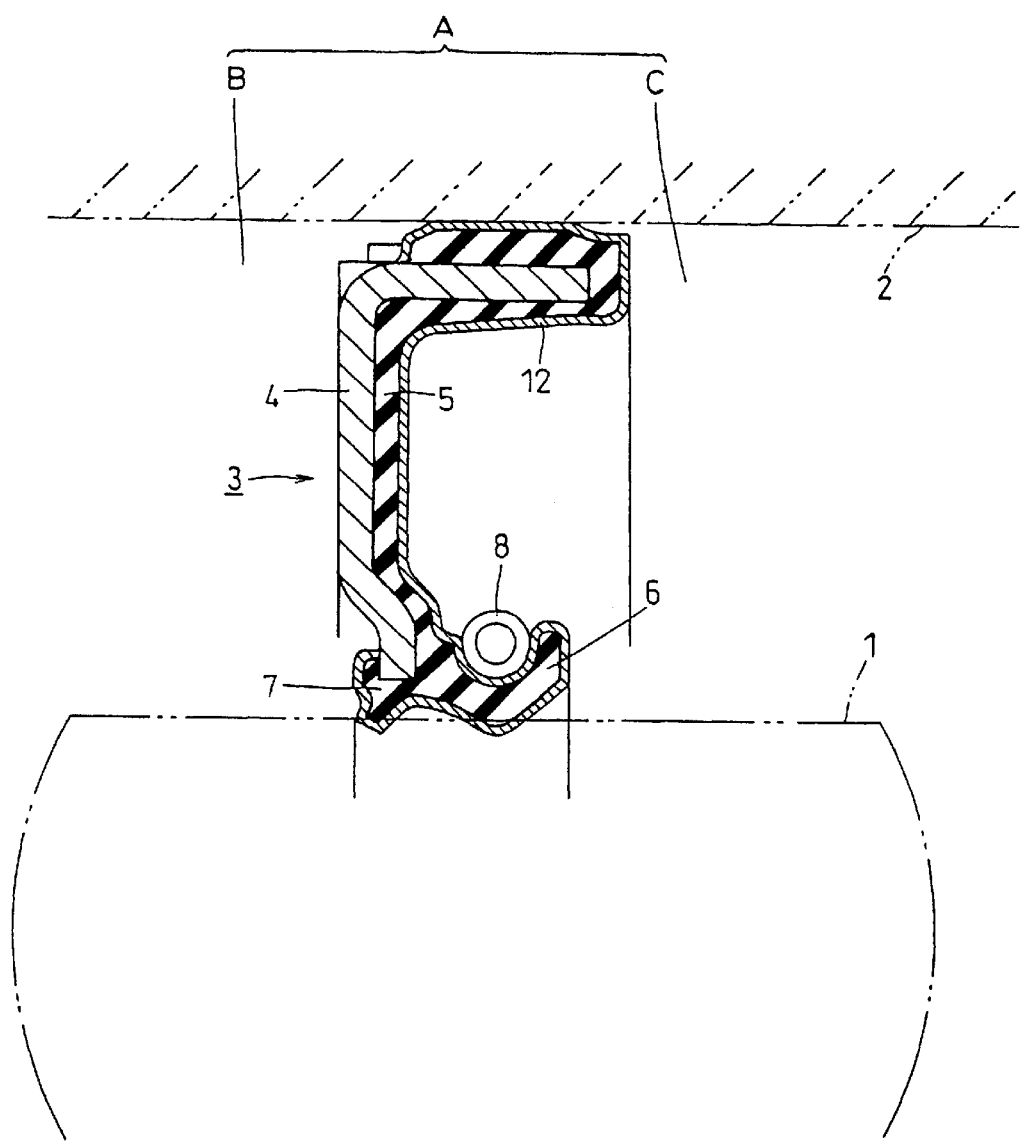
FIG. 6 is a longitudinal sectional view of the upper half of a seal according to Embodiment 4 of the present invention.

Fluorine-contained Rubbers vinylidene fluoride rubber tetrafluoroethylene-propylene Rubber tetrafluoroethylene-perfluoromethyl vinyl ether rubber phosphazene fluorocarbon rubber In this case, the material of the lip may be ordinary rubber such as nitrile rubber, acrylic rubber or silicon rubber and a material, such as a film 12 of the above-stated fluorine-contained rubber or resin having the above-stated nitrogen gas permeability of 3.225 (cm$^3$/m$^2$/25 $\mu$m/24 h/25° C. atm) or lower may be provided on the surface of this lip as shown in Embodiment 4 of FIG. 6.

Figure 7:
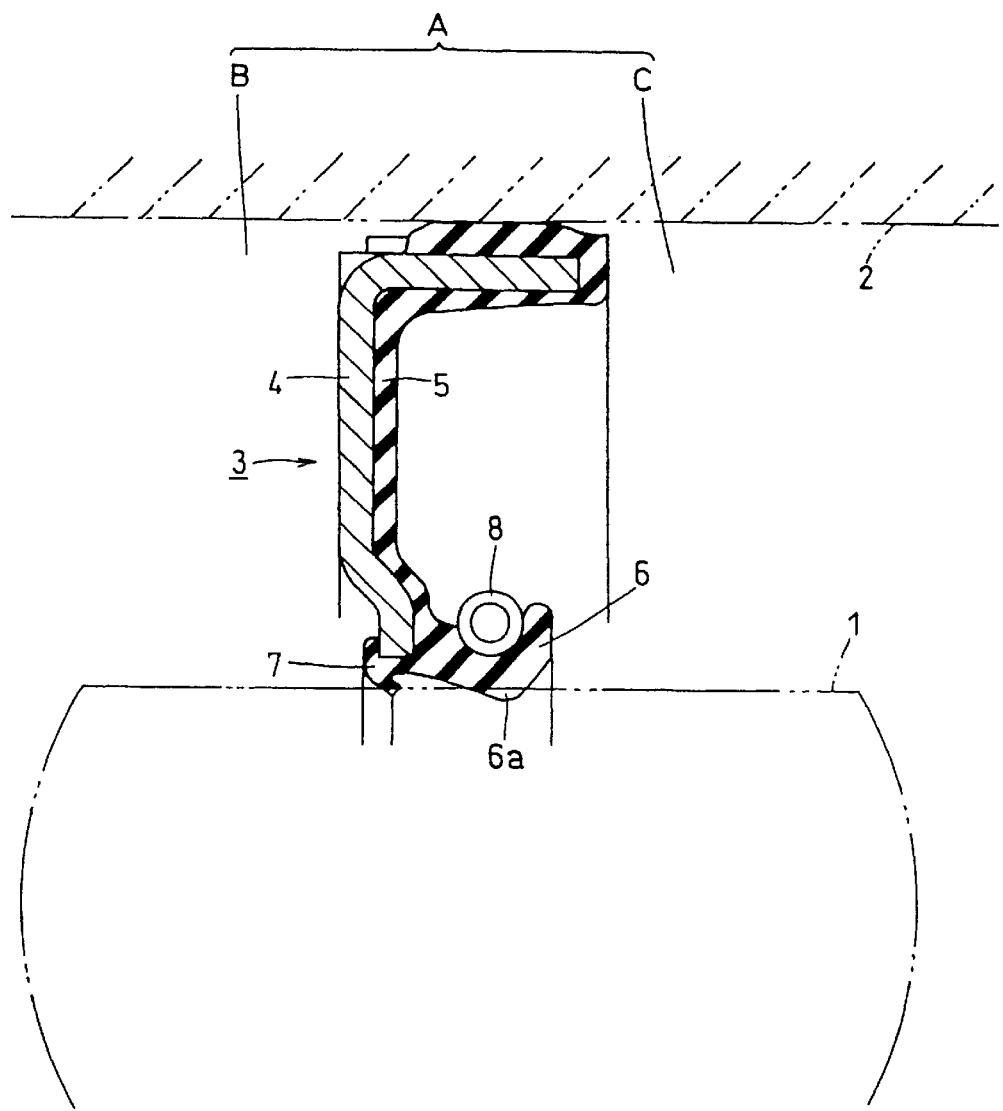
FIG. 7 is a longitudinal sectional view of the upper half of a seal according to Embodiment 5 of the present invention.

While the auxiliary lip 7 of the seal 3 in each embodiment stated above has a tapered shape having gradually reduced diameter toward the sealing target space B side which is the other side in axial direction, the auxiliary lip 7 may have a tapered shape having gradually reduced diameter toward the atmospheric pressure space C side as shown in Embodiment 5 of FIG. 7.

Since the auxiliary lip 7 having the above-stated structure can secure a sufficient interference, it is possible to prevent the auxiliary lip 7 from being turned up on the vacuum space B side due to the excessive pressure difference between the both sides and to further improve the sealing performance of the seal.

(3) In case of the seal 3 shown in FIGS. 1 and 2, the hardness of the elastic element 5 is set at a durometer hardness [HD] of 30 to 90 according to Embodiment 6. In this case, the hardness of the overall elastic element 5 may not be set at the above durometer hardness but only the hardness of the lips 6 and 7 on the inner peripheral-side end portion of the elastic element 5, the hardness of the portions on which the both lips 6 and 7 slide on and contact with the rotary shaft or the hardness of the portions on which the main lip 6 slides on and contact with the rotary shaft may be set at the durometer hardness [HD] of 30 to 90.

In case of the seal in Embodiment 6, if the hardness of the both lips 6 and 7 is set at a durometer hardness less than 30, the slight fluttering of the lips occurs. If set at a durometer hardness exceeding 90, the adhesiveness of the both lips 6 and 7 with respect to the rotary shaft 1 deteriorates when the rotary shaft 1 stops or rotates.

The slight fluttering of a lip means as follows. If the slide-contact portion of, the lip slides on and contacts with a slide-contact surface having a strict lubricating condition and a high friction factor, the slide-contact portion does not slide on the slide-contact surface but frictionally engages with the slide-contact surface due to the frictional force of the portion with respect to the slide-contact surface. As a result, the lip is extended in the rotation direction of the rotary shaft 1. If a shrinkage force derived from the extension exceeds the above-stated frictional engagement force, the lip shrinks. The slight fluttering of the lip signifies a phenomenon in which extension-shrinkage actions are repeated.

If the hardness of the lips is set at a durometer hardness in the range of 30 to 90, the slight fluttering of the lips 6 and 7 does not occur and the adhesiveness thereof with respect to the rotary shaft 1 does not deteriorate.

An elastic element 5 having a durometer hardness [HD] is be exemplified by rubber, resin or the like. The rubber is exemplified by nitrile rubber, acrylic rubber, fluorine-contained rubber, urethane rubber, butyl rubber, polysulfide rubber or the like. The resin is exemplified by fluorine-contained resin, nylon resin or the like.

The fluorine-contained resin is exemplified by PTFE (tetrafluoroethylene resin), PFA (tetrafluoroethylene-perfluoroalkyl vinyl ether copolymer resin), FEP (tetrafluoroethylene-propylene hexafluoride copolymer resin), ETFE (tetrafluoroethylene-ethylene copolymer resin), CTFE (trifluorochloroethylene resin) or PVDF (vinylidene fluoride resin).

The nylon resin is exemplified by nylon 6, nylon 66, nylon 12, nylon 46, nylon 11, ultra high molecular weight polyethylene (UHMW-PE), ethylene-vinyl acetate copolymer (EVA), low-density polyethylene, high-density polyethylene, unplasticized polyvinyl chloride (UPVC) or soft polyvinyl chloride.

Description will be given to methods of adjusting the hardness of the elastic element 5 to the above-stated durometer hardness [HD]. If the material of the elastic element 5 is, for example, rubber, various types of filling materials are mixed into the rubber so as to secure physical solid-state. Among such methods, there is a method of adjusting the mixture quantity of carbon black to adjust a durometer hardness [HD]. If the mixture quantity of carbon black is larger, the durometer hardness [HD] tends to becomes higher. By way of example, if the quantity of carbon is 5% by weight with respect to polymer, the elastic element has a durometer hardness [HD] of 20. If 20%, the elastic element has a durometer hardness [HD] of 30.

Further, in the above case, if the elastic element 5 is rubber, the rubber is a composite material having polymer, which is the main material of the rubber as the elastic element, filled with various inorganic matters and organic matters. These filling materials are mainly powdery and non-elastic elements, from which respect there is a possibility that the rubber is a mixture of an elastic element and a non-elastic element.

In the above case, if the hardness of only the slide-contact portion of the lip is a durometer hardness [HD] stated above and the elastic element 5 is, for example, rubber, then it is possible to vulcanize two types of rubber into layered structure. Using this method, it is possible to set the hardness of the slide-contact portion of the lip at the above-stated durometer hardness [HD]. It is also possible to compositely bond rubber and resin to each other and to form the slide-contact portion of the lip out of a material having the above durometer hardness [HD].

In case of Embodiment 6, if the hardness of both the lips 6 and 7 is set to fall within the range of the above-stated durometer hardness while the axial slide-contact width W0 falls within the above range, it is possible to obtain a seal having further improved sealing performance.

(4) In case of the seal 3 shown in FIG. 3, the hardness of the overall elastic element 5, the hardness of each of the main lip 6 and the auxiliary lip 11, the hardness of only the slide-contact portions of the lips 6 and 11 or the hardness of only the slide-contact portion of the main lip 6 is set, as Embodiment 7, at a durometer hardness [HD] in the range of 30 to 90 as in the case of Embodiment 7.

As a result, no slight fluttering occurs to both the lips 6 and 11 of the seal 3 in Embodiment 7 and the adhesiveness of the seal 3 with respect to the rotary shaft 1 does not deteriorate.

(5) In case of a seal shown in FIGS. 4 and 5, the hardness of at least the slide-contact portion of each of the main lip 6 and the auxiliary lip 7 is set as Embodiment 8, at a durometer hardness [HD] in the range of 30 to 90 as in the case of Embodiment 6.

As a result, no slight fluttering occurs to both the lips 6 and 7 of the seal 3 in Embodiment 8 and the adhesiveness of the seal 3 with respect to the rotary shaft 1 does not deteriorate.

Figure 8:
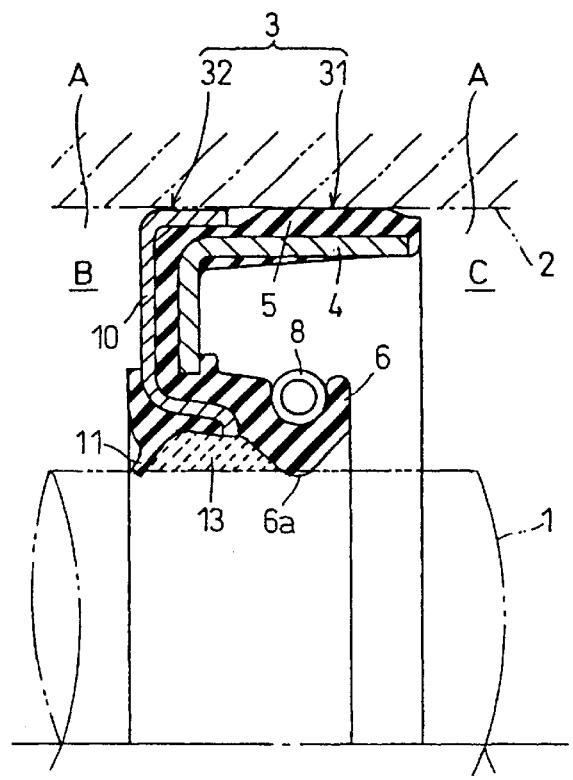
FIG. 8 is a longitudinal sectional view of the upper half of a seal according to Embodiment 9 of the present invention.
Figure 9:
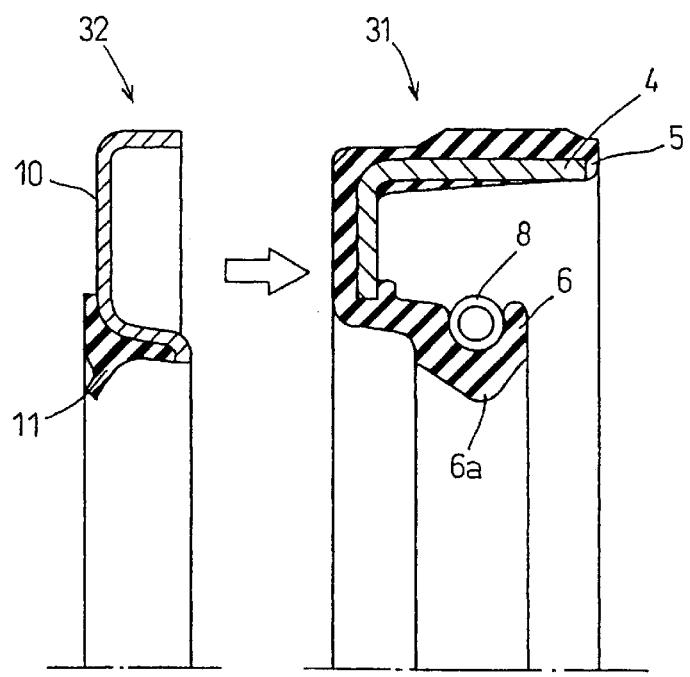
FIG. 9 is an exploded, longitudinal sectional view of the upper half of the seal shown in FIG. 8.

(6) In case of a seal 3 shown in FIGS. 8 and 9, a lubricant 13 such as oil or grease is filled into a space surrounded by a main lip 6, an auxiliary lip 11 and a rotary shaft 1 according to Embodiment 9. The seal 3 can be divided into two seal portions 31 and 32 which portions can be assembled into the seal 3.

With the above structure, a partition wall partitioning an annular space A into two spaces, i.e., a sealing target space B and an atmospheric pressure space C which greatly differ in pressure is thick since the lubricant 13 is added besides the lips 6 and 11. Due to this, even if the sealing target space B is a vacuum space, it is possible to secure sufficient sealing performance.

Moreover, since the lubricant 13 can be supplied to the slide-contact surface of the main lip 6 with respect to the rotary shaft 1 from both the lips 6 and 11, it is possible to prevent the earlier abrasion of the seal caused by the sliding and contact of the seal on and with the rotary shaft.

Furthermore, because of the simple structure, production cost can be made lower and the lubricant can be surely held to thereby ensure the long, stable supply of the lubricant to the slide-contact surfaces.

In this case, the lubricant 13 is basically fluid or liquid lubricant such as oil or grease and basically does not have a shape holding property. However, the lubricant should not be limited thereto. A so-called polymer lubricant obtained by mixing a lubricant such as mineral oil or poly-α-olefin or grease which is thickener-added lubricant into resin such as high-density polyethylene propylene, filling the resultant lubricant, heating the lubricant at a temperature higher than the melting point of the resin, cooling and then solidifying the lubricant may be used.

A solid lubricant is capable of holding a predetermined shape to some extent. Due to this, compared with a lubricant such as liquid oil or grease, the lubricant can be densely filled into the space between the main lip 6 and the auxiliary lip 11 of the seal 3 in accordance with the shape of the space. Besides, even if the shapes of the main lip 6 and the auxiliary lip 11 are changed after the lips slide on and contact with the rotary shaft 1, the solid lubricant can follow up the change of shape relatively easily. Thus, the solid lubricant is particularly effective for the seal 3 and can be held between the main lip 6 and the auxiliary lip 11 of a conventional seal with excellent holding strength. As a result, even if the auxiliary lip 11 floats, it is possible to advantageously prevent the leakage of the lubricant 13 into the sealing target space B.

While the lubricant 13 is filled into the space between the main lip 6 and the auxiliary lip 11 in this embodiment, the lubricant 13 may be filled into the space between the slant face of the main lip 6 and the rotary shaft 1 with a view of providing shape holding property. In the latter case, even if the length of the lubricant to the auxiliary lip 11 becomes longer and the lubricant 13 leaks into the space between the main lip 6 and the auxiliary lip 11, the lubricant can be stored in the space, thereby making it possible to advantageously, effectively prevent the leakage of the lubricant 13 to the outside of the auxiliary lip 11.

In this case, a lubricant 13, such as oil or grease, having steam pressure of $10^{-8}$ Pa or lower (atmospheric temperature of 20° C.) may be filled into the space between the main lip 6 and the auxiliary lip 11. Such a lubricant 13 having low steam pressure is less volatile. Due to this, even if the lubricant 13 is somewhat leaked to the sealing target space B through the auxiliary lip 11, gas components are not dispersed. Therefore, there is no fear of contaminating the atmosphere of the sealing target space B and no fear of causing the abnormality of, for example, a vacuum equipment arranged in the sealing target space B.

Figure 10:
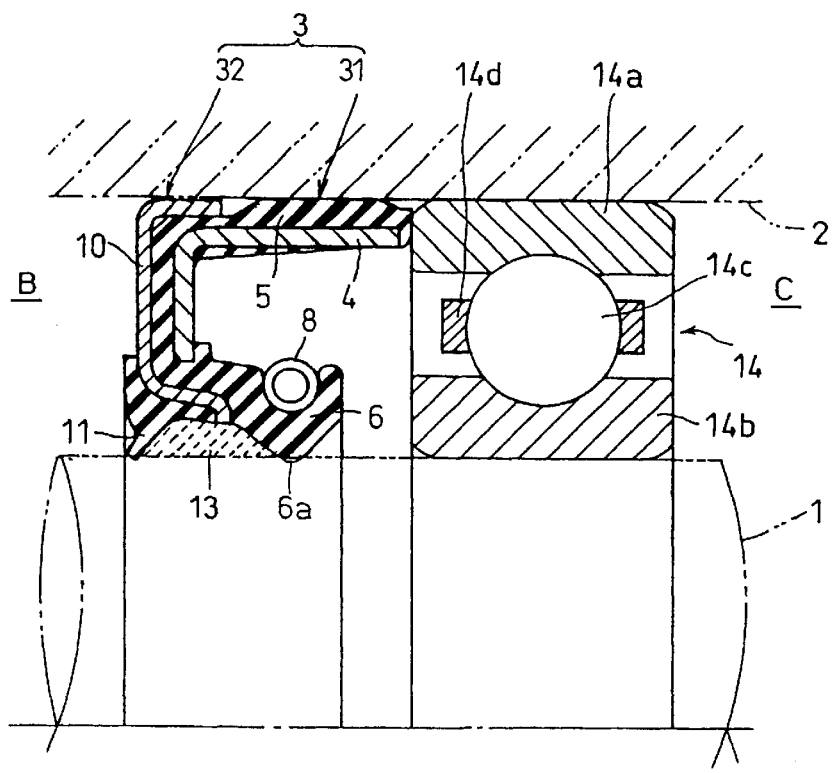
FIG. 10 is a longitudinal sectional view of the upper half of a bearing unit which is a combination of the seal shown in FIG. 8 and a bearing using the seal according to Embodiment 10 of the present invention.

Further, as Embodiment 10, the sealing target space B and the atmospheric pressure space C are partitioned off from each other and the bearing 14 is sealed in the atmospheric pressure space C as shown in FIG. 10. The seal 3 may be arranged integrally with one side of the rolling bearing 14 as a bearing unit. The rolling bearing 14 has an outer ring 14a, an inner ring 14b, a plurality of rolling elements 14c and a cage 14d. In Embodiment 10, the inner peripheral side of the seal 3 may be a fixed member and the outer peripheral side thereof may be sealed against the annular space between two members serving as rotary members. In that case, the inside diameter-side vertex portion 6a of the triangular main lip 6 may be a sharp edge.

Figure 11:
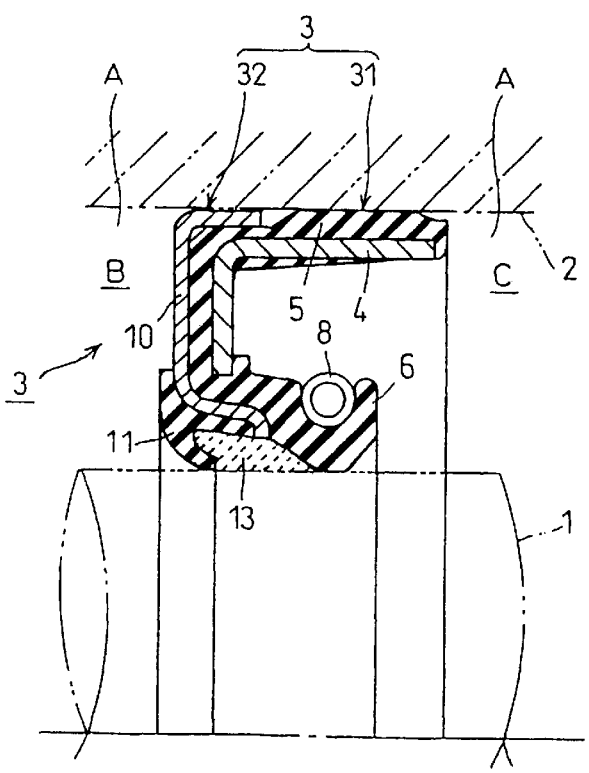
FIG. 11 is a longitudinal sectional view of the upper half of a seal according to Embodiment 11 of the present invention.

Further, the auxiliary lip 11 may have an upper half cross section of a tapered shape having the diameter of gradually reduced toward the atmospheric pressure space C side as Embodiment 11 as shown in FIG. 11.

If a seal 3 having the auxiliary lip 11 shown in FIG. 11 is used under the above-stated specific environment, the auxiliary lip 11 slides on and contacts with the rotary shaft 1 while being inclined in the direction of the main lip 6. Due to this, the two lips, i.e., the main lip 6 and the auxiliary lip 11 contacting with the rotary shaft 1 are shaped to have increased contact pressure by pressure acting from the atmospheric pressure space C side toward the sealing target space B side. As a result, even if pressure for attracting the lip from the atmospheric pressure space C side to the sealing target space B side is applied to the auxiliary lip 11, the auxiliary lip 11 does not float from the rotary shaft 1. Thus, the auxiliary lip 11 can secure an interference with respect to the rotary shaft 1, thereby advantageously, greatly contributing to a sealing action under such a specific environment.

Furthermore, by constituting the auxiliary lip 11 to have the structure shown in FIG. 11, even if the lubricant 13 is greatly attracted into the sealing target space B due to the pressure difference between the sealing target space B and the atmospheric pressure space C, the lubricant 13 can be held in the space between the main lip 6 and the auxiliary lip 11 with high holding capability because of the inclination of the auxiliary lip 11. As a result, it is possible to supply the lubricant 13 to the slide-contact surface of the main lip 6 with respect to the rotary shaft 1 stably for a long time, whereby the earlier abrasion of the main lip 6 can be advantageously, stably prevented.

In this case, the auxiliary lip 11 does not float from the rotary shaft 1. Due to this, even if the lubricant 13 is liquid and does not have shape holding property, the good sealing state of the space surrounded by the main lip 6, auxiliary lip 11 and the rotary shaft 1 is ensured and the lubricant 13 can be held in the space in a good manner, with the result that easily, a commercially available and inexpensive lubricant 13 can be advantageously used.

Moreover, since it becomes possible to better hold the lubricant 13 thanks to the above-stated structure of the auxiliary lip 11, there is no probability that the lubricant 13 leaks to the sealing target space B-side and contaminates the interior of the sealing target space B. Thus, the seal is particularly favorable if it is necessary to hold the interior of the sealing target space B in a clean atmosphere.

Figure 12:
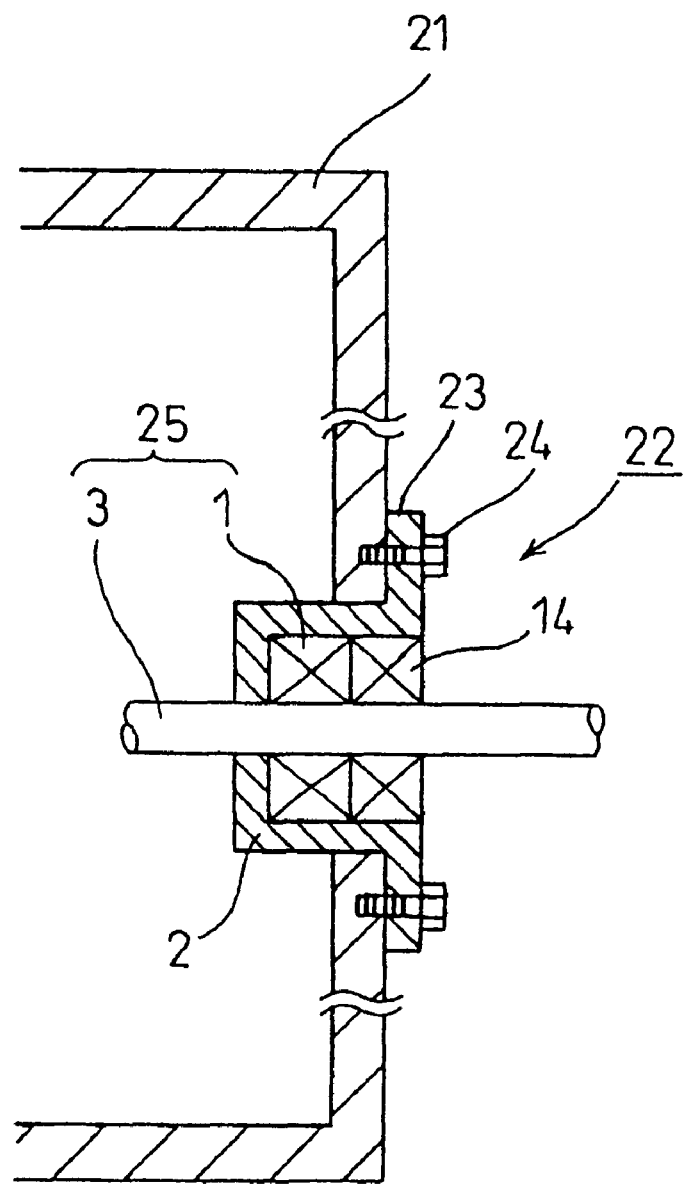
FIG. 12 is a schematic cross-sectional view of a vacuum chamber to which a rotational assembly is installed according to Embodiment 12 of the present invention.

(7) FIGS. 12 and 13 relate to a seal, as Embodiment 12, applied to a vacuum chamber equipped with a rotation introducing machine. FIG. 12 is a cross-sectional view showing the schematic of the vacuum chamber equipped with the rotation introducing machine. FIG. 13 is an enlarged cross-sectional view of a bearing unit in the rotation introducing machine.

The vacuum chamber 21 is provided to conduct required operations such as the delivery of a workpiece while holding the interior of the chamber in vacuum.

The vacuum chamber 21 is equipped with the rotation introducing machine 22 in the rotation introducing machine attachment hole of a chamber wall to introduce rotation necessary for the delivery operation.

The rotation introducing machine 22 is arranged, for example, to range over the interior and exterior of the chamber wall of the vacuum chamber 21 so as to introduce rotational power for the delivery of the workpiece in the chamber.

The rotation introducing machine 22 is provided with a rotary shaft 1, a housing 2, a rolling bearing 14 and a seal 3.

The attachment flange 23 of housing 2 is fixed to the chamber wall by screws 24 and the housing 2 is attached to the attachment holes of the chamber wall.

The rotary shaft 1 is penetrated into the housing 2 to be exposed to the interior and exterior of the housing 2 and rotatably supported within, the housing 2 by the rolling bearing 14. The rotary shaft 1 and the seal 3 constitute a rotational assembly 25 as a whole.

The rolling bearing 14 is disposed in the housing 2 while facing a sealing target space A of $10^{-4}$ Pa or lower, i.e., the vacuum chamber 21 through the seal 3.

The seal 3, which is a pressure proof seal, partitions an annular space, in which the rotary shaft 1 and the housing 2 face each other, into a vacuum space, i.e., a sealing target space B which communicates with the interior of the vacuum chamber 21 and an atmospheric pressure space C which communicates with the exterior of the vacuum chamber 21 and in which the rolling bearing 14 is located to thereby shut off the exterior of the vacuum chamber 21 from the interior thereof.

A lubricating film 26 is continuously formed on the inside diameter-side vertex portion 6a of the main lip 6, the both slant faces thereof, a lubricant holding surface between lips 6 and 11 and the surface of the auxiliary lip 11.

The material of the lubricating film 26 is selected from one of a group consisting of soft metal (gold, silver, copper and the like), fluorine-contained resins (polytetra fluoroethylene and the like) and DLC (or diamond like carbon corresponding to all carbon-contained materials having the intermediate property between a carbon sintered element including graphite and a diamond coat).

Further, a lubricating film 27 formed out of one selected from the soft metal, the fluorine-contained resins and DLC is continuously formed on the surface of the rotary shaft 1.

In case of the seal 3 constituted as stated above, the lubricating films 26 and 27 are formed on the respective surfaces of the lips 6, 11 and the rotary shaft 1. Due to this, even if the lips 6 and 11 slide on the rotary shaft 1 with the passage of time, the abrasion of these lips 6 and 11 can be greatly reduced. As a result, even under the above-stated specific environment, the sealing performance of the seal can be advantageously held.

In the above-stated example, the lubricating film 27 (or soft lubricating film) is formed out of soft metal, fluorine-contained resin or DLC on the surface of the rotary shaft 1. Alternatively, a lubricating film 27 (or manganese phosphate salt lubricating film) may be formed on the surface of the rotary shaft 1 by a film formation treatment using a manganese phosphate salt compound solution.

Such a manganese phosphate salt lubricating film 27 preferably has not only lubricating property but also a function of holding a lubricant such as oil or grease.

Now, the formation of the manganese phosphate salt lubricating film 27 on the surface of the rotary shaft 1 will be described. A pretreatment such as cleaning is conducted to the surface of the rotary shaft 1 and then a film formation treatment is conducted thereto using a manganese phosphate salt compound solution. As a result of this treatment, the corrosion of the surface of the rotary shaft 1 by the manganese phosphate salt compound and the deposition of manganese phosphate salt crystals on the surface occur. Then, small, shallow irregularities are formed on the surface of the rotary shaft 1 by the above-stated corrosion action and, at the same time, a manganese phosphate salt lubricating film 27 is formed on the entire surface of the rotary shaft 1.

In this case, initial irregularities derived from polishing or the like during manufacturing process exist on the surface of the rotary shaft 1 before this manganese phosphate salt lubricating film 27 is formed. These initial irregularities are relatively large in size and unevenly distributed. Besides, particularly deep stripe-shaped recesses are dispersed in the initial irregularities. If the manganese phosphate salt lubricating film 27 is formed on the surface of the rotary shaft 1 having such uneven initial irregularities, the uneven initial irregularities are flattened by very small, even irregularities formed by the corrosion action and the dispersed deep stripe-shaped recesses are cut off and eliminated, whereby very small irregularities are evenly distributed. Due to this, shallow, very small irregularities are formed almost evenly on the surface of the manganese phosphate salt lubricating film 27 on which irregularities are formed evenly in the same manner as the formation of the former irregularities. Thus, manganese phosphate salt lubricating film 27 in which very small irregularities are formed on the surface of the rotary shaft 1. As a result, this manganese phosphate salt lubricating film 26 has a lubricating property and a lubricant holding function, and suppresses the abrasion of the rotary shaft 1, thereby advantageously securing the sealing performance between the film and the seal.

The manganese phosphate salt lubricating film 27 may be formed on at least the slide portion of the rotary shaft 1 with respect to the seal 3.

In the above-stated Embodiment 12, the soft lubricating film 27 of soft metal, fluorine-contained resin or DLC is formed on the surface of the rotary shaft 1. Alternatively, a lubricating film 27 (or lipophobic lubricating film) having lipophobic property may be formed on the surface of the rotary shaft 1. The material of the lipophobic lubricating film 27 is a fluorine-contained lipophobic agent such as Teflon or PTFE. The material is coated on the surface of the rotary shaft 1.

As a result of this treatment, oil adheres to the surface of the rotary shaft 1 less easily (wettability deteriorates). The lipophobic lubricating film 27 also prevents an oil component within the rolling bearing 14 from leaking into the vacuum chamber 21 because of the lipophobic property thereof, thereby advantageously maintaining the chamber under a good atmosphere.

It is noted that this lipophobic lubricating film 27 is not necessarily formed on the entire surface of the rotary shaft 1. The film 27 may be formed on the slide portion of the rotary shaft 1 with respect to the seal 3 to the end portion thereof in the direction of the sealing target space B.

In the above-stated Embodiment 12, only one of the soft lubricating film of soft metal, fluorine-contained resin or DLC, the manganese phosphate salt lubricating film and the lipophobic lubricating film is formed on the surface of the rotary shaft 1. Alternatively, the surface of the rotary shaft 1 may be partitioned into regions in axial direction, a manganese phosphate salt lubricating film may be formed in one region and a lipophobic lubricating film may be formed in the other region. If so, the rotary shaft 1 advantageously exhibits both lubricating property and lipophobic property.

While the rolling bearing 14 and the seal 3 are provided to be separated from each other in the above-stated Embodiment 12, the seal 3 may be integrated into the rolling bearing 14.

If the seal 3 is integrated into the rolling bearing 14, a lipophobic lubricating film may be formed on part of the shoulder portion of the inner ring 14b of rolling bearing 14 on which the seal 3 is arranged, as, for example, a slide portion on which the seal 3 slides.

In this case, if the entry of not oil for the rolling bearing 14 but water into the vacuum chamber 21 is to be prevented, a lipophobic lubricating film may be formed on the surface of the rotary shaft 1.

Figure 14:
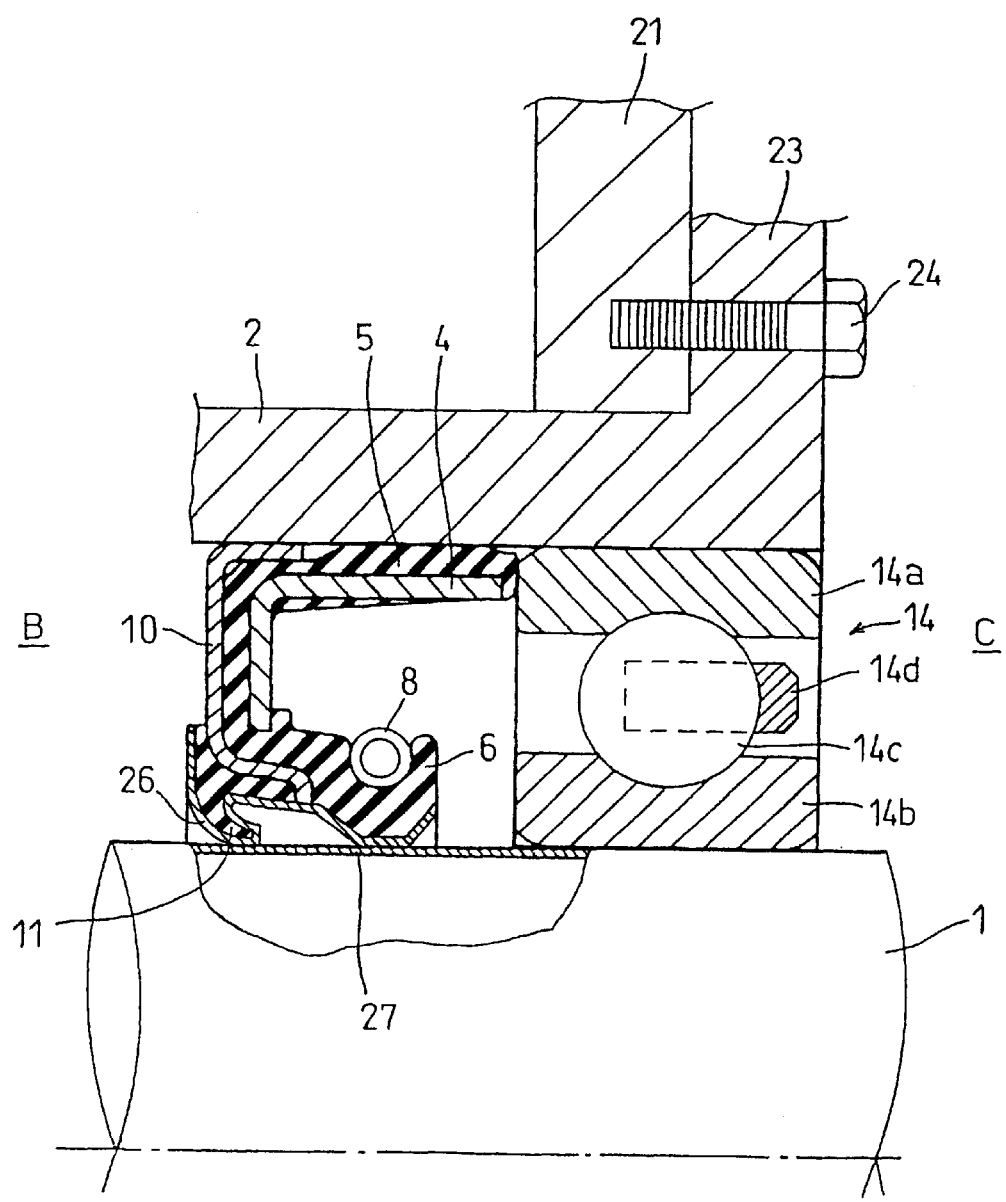
FIG. 14 is an enlarged cross-sectional view of important parts including a modified seal and corresponding to those shown in FIG. 12 according to Embodiment 13 of the present invention.

As shown in Embodiment 13 of FIG. 14, an auxiliary lip 11 may be formed to have a tapered shape having an upper half cross section having gradually reduced diameter toward the atmospheric pressure space C side. By using the auxiliary lip 11 having such a structure, an interference with respect to the rotary shaft 1 (or the difference between the inside diameter of the auxiliary lip 11 and the axial diameter of the rotary shaft 1) is sufficiently secured. As a result, it is possible to prevent the auxiliary lip 11 from being turned up toward the sealing target space B side due to the excessive pressure difference generated between the two spaces and to thereby further improve the sealing performance of the seal.

Figure 15:
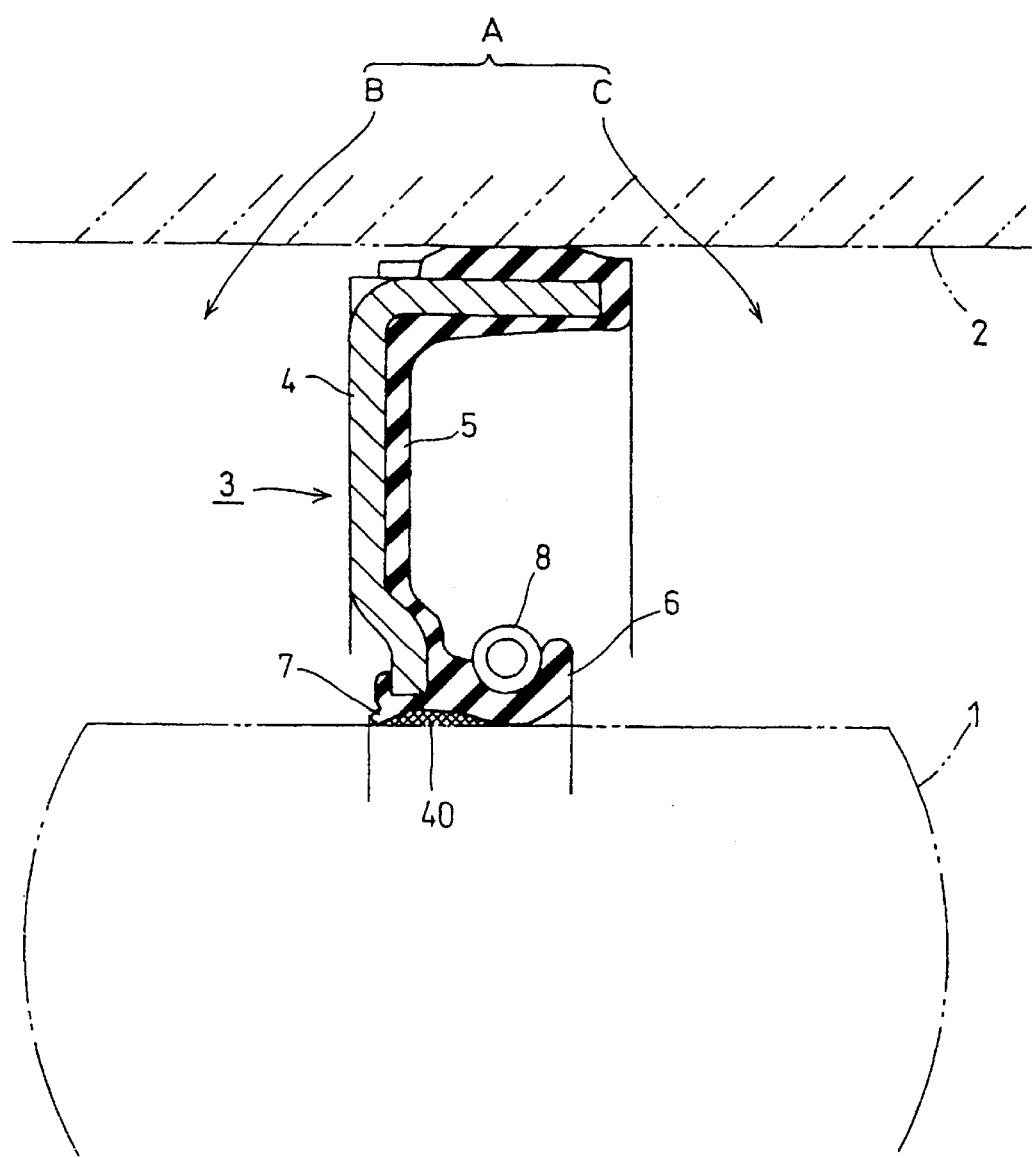
FIG. 15 is a longitudinal sectional view of the upper half of a seal according to Embodiment 14 of the present invention.

(8) In case of a seal 3 according to Embodiment 14 shown in FIG. 15, the material of an elastic element 5 may be freely selected from those having elastic and magnetic properties such as rubber or resin.

The rubber is exemplified by silicon rubber, nitrile rubber, acrylic rubber, fluorine rubber or hydrogen-added nitrile rubber. The resin is exemplified by 6 nylon resin, 12 nylon resin, 11 nylon resin, 66 nylon resin or 46 nylon resin.

The elastic element 5 is entirely magnetized and has a property of magnetically attracting a magnetic element. Due to this, the main lip 6 and the auxiliary lip 7 serve as a magnetization section as a whole to magnetically attract a magnetic fluid 40 between the lips 6 and 7. The magnetic fluid 40 is filled into the space surrounded by the rotary shaft 1, the main lip 6 and the auxiliary lip 7. Thus, the magnetic fluid 40 is maintained by the magnetic attraction action of the magnetization section in a good state.

The magnetic fluid 40 is obtained by mixing magnetic powder into a predetermined solvent. Since this solvent is, for example, synthetic hydrocarbon oil, the magnetic powder is magnetically attracted by the magnetization section but the solvent is not magnetically attracted.

Further, the magnetic powder is exemplified by magnetite colloids obtained by a well-known wet method. Also, those obtained by a so-called wet levigation method for levigating magnetite colloids in the water using a ball mill may be used. Those obtained by a dry method may be used. A ferromagnetic oxide such as manganese ferrite other than magnetite, cobalt ferrite or a composite ferrite of manganese ferrite or cobalt ferrite, zinc and nickel, barium ferrite or the like, or a ferromagnetic metallic layer such as iron, cobalt or rare-earth metal may be used.

Figure 16:
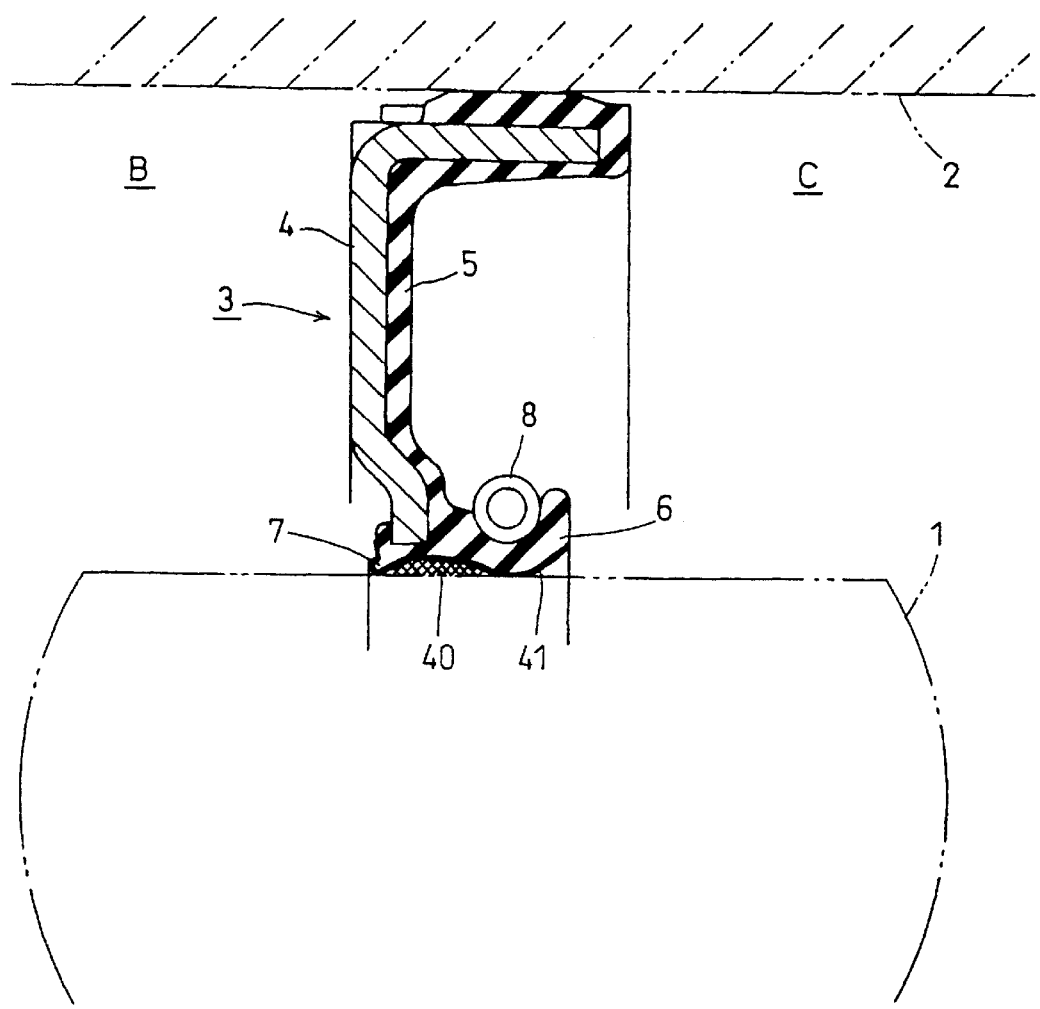
FIG. 16 is a longitudinal sectional view of the upper half of a seal showing a modification of a magnetization section according to Embodiment 15 of the present invention, which view corresponds to FIG. 15.

In this case, as Embodiment 15, the elastic element 5 may not be entirely magnetized but only the surface layers 41 of the lips 6 and 7 may be magnetized to serve as a magnetization section as indicated by a thick line of FIG. 16. Alternatively, as Embodiment 16, only a part 42 of the surface layer of the main lip 6 may be magnetized to serve as a magnetization section as indicated by a thick line of FIG. 17.

In any case, the magnetization section is formed between the lips 6 and 7 and in the vicinity of the slide-contact portion of the main lip 6. As a result, the magnetic fluid 40 is held between the lips 6 and 7 by the magnetic attraction of the lips 6 and 7.

According to the above-stated seal 3, since the slide-contact portion of the main lip 6 slides on and contacts with the rotary shaft 1, it is possible to maintain the same good sealing performance as that of a contact seal. In addition, since the magnetic fluid 40 held between the lips 6 and 7 by the magnetic attraction acts as a lubricant for the slide-contact portions, the accelerated abrasion of the slide-contact portions under a non-lubricant environment, which is the shortcoming of the contact seal, can be suppressed, with the result that the seal 3 has high sealing performance even under the non-lubricant environment.

Moreover, according to the seal 3 stated above, since the magnetic fluid 40 is magnetically attracted and held by the lips 6 and 7 even if the pressures of the two spaces stated above are imbalanced. As a result, the seal 3 is free from the shortcoming of the conventional magnetic fluid seal that the magnetic fluid is sputtered toward the vacuum space side due to the imbalanced pressure, thereby making it possible to maintain high sealing performance under an imbalanced pressure environment.

In the above-stated embodiment, the magnetization section is provided in the vicinity of the slide-contact portion of the main lip 6 and on the inner peripheral side of the main lip 6 which side faces the auxiliary lip 7. As Embodiment 17, an annular magnetic element 43 may be provided to be bonded to the vicinity of the slide-contact portion of the main lip 6 at the same position or may be provided by inserting the magnetic element 43 into a molding die at the time of forming the elastic element 5 as shown in FIG. 18.

In that case, the magnetic element 43 is located in the vicinity of the slide-contact portion of the main lip 6. Due to this, the magnetic fluid 40 is magnetically attracted by this magnetic element 43, whereby the seal in this embodiment exhibits the same function and advantage as stated above such as the exertion of a lubricating action and a sealing action on the slide-contact portion of the main lip 6.

The main lip 6 and the auxiliary lip 7 are formed integrally with each other in the inner periphery of the same elastic element 5 in the above-stated embodiment. Alternatively, as Embodiment 18, a structure including a metallic annular element 10 and an auxiliary lip 11 may be adopted as shown in FIG. 19.

In this embodiment, the elastic element 5 is magnetized as in the case of FIG. 15 or only the main lip 6 is magnetized as shown in FIGS. 16 and 17 while the auxiliary lip 11 is not magnetized.

In this case, since the main lip 6 is magnetized and the auxiliary lip 11 is not magnetized, a magnetic fluid 40 between the both lips 6 and 11 is magnetically attracted by the main lip 6, whereby the seal exhibits the same function and advantage as those stated above including the exertion of a lubricating action and a sealing action on the slide-contact portion of the main lip 6.

Figure 20:
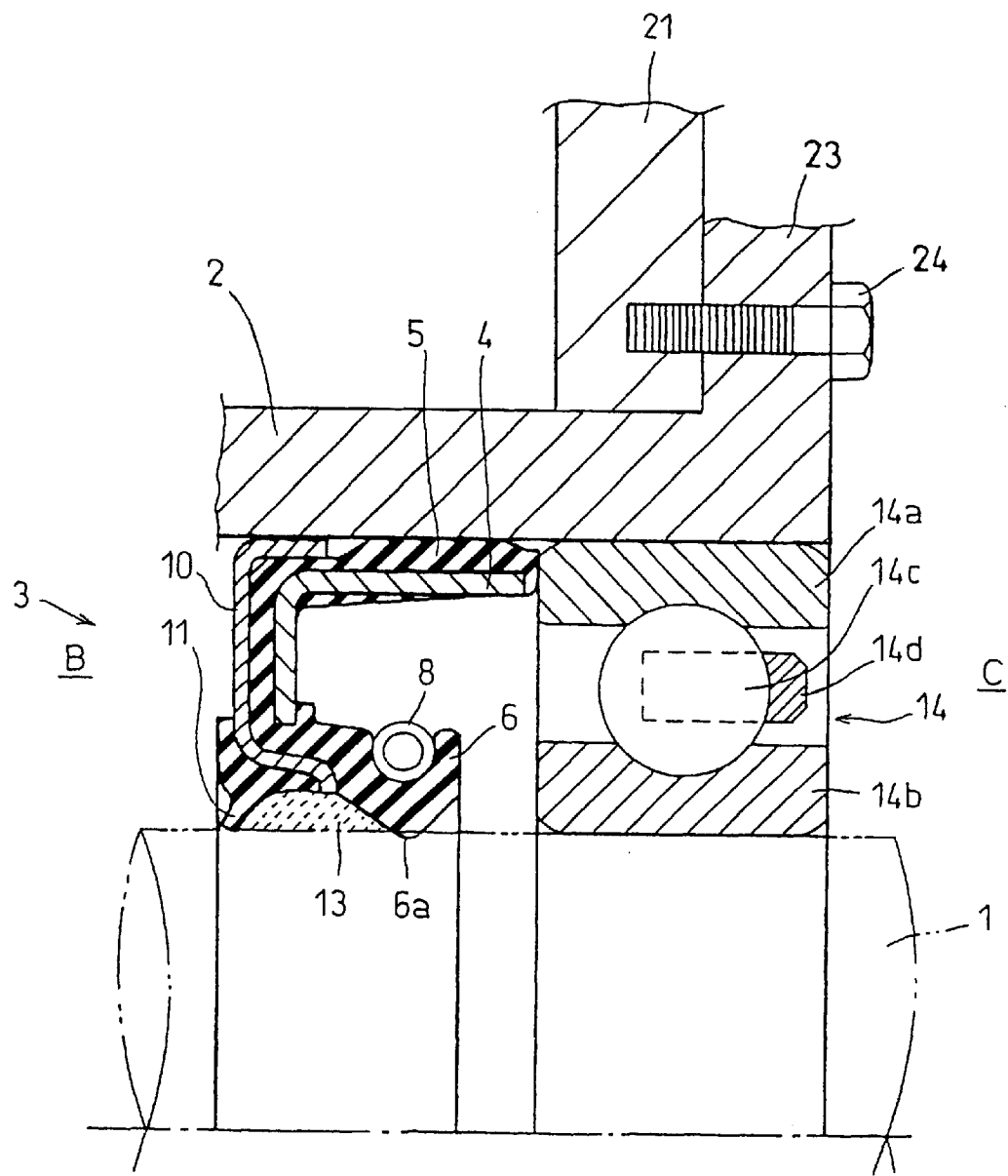
FIG. 20 is an enlarged, longitudinal sectional view of the upper half of a bearing unit according to Embodiment 19 of the present invention.

(9) According to a pressure proof seal 3 in Embodiment 19, a lubricant 13, such as oil or grease, is filled into the space surrounded by a main lip 6, an auxiliary lip 11 and a rotary shaft 1 as shown in FIG. 20.

Here, the material of the lips 6 and 11 will be described in detail. Under the above-stated specific environment, excessive pressure difference is applied to the lips and atmospheric pressure space C-side gas permeates into the lips themselves toward a sealing target space B side. Considering this, the various types of materials of the lips in accordance with the degree of vacuum of the sealing target space B were selected and experimented. As a result, it was confirmed that if the material of (iv) below is selected under the use conditions of (iii), the permeation of gas into the lips can be effectively prevented and the sealing performance of the seal improves.

(iii) Use Conditions a. Pressure of sealing target space: $10^{-4}$ Pa or lower.

b. Leakage speed of sealing fluid from sealed portion: $10^{-9}$ Pam$^3$/sec or lower.

c. Temperature used: 25° C.

It is noted that the numerical value of the degree of vacuum is one of the use conditions and not necessarily a fixed value. For example, the numerical value corresponds to the required degree of vacuum of the interior of the vacuum chamber. The numerical value of the degree of vacuum is not, therefore, essential to the use conditions according to the present invention. In addition, the pressure of the atmospheric pressure space C relative to the sealing target space B having this degree of vacuum is normal atmospheric pressure.

(iv) Lip Material

On the premise that the degree of vacuum is that of the sealing target space B out of the both spaces between which the lip is put under the conditions (iii) above, a material having nitrogen gas permeability, which is one of the chemical properties of a plastic film, of 3.225 (cm$^3$/m$^2$/25 $\mu$m/24 h/25° C. atm) or less was selected as the material of the lip according to the present invention. Then, nitrogen gas did not permeate into the lip and the sealing performance of the seal 3 improved.

Figure 21:
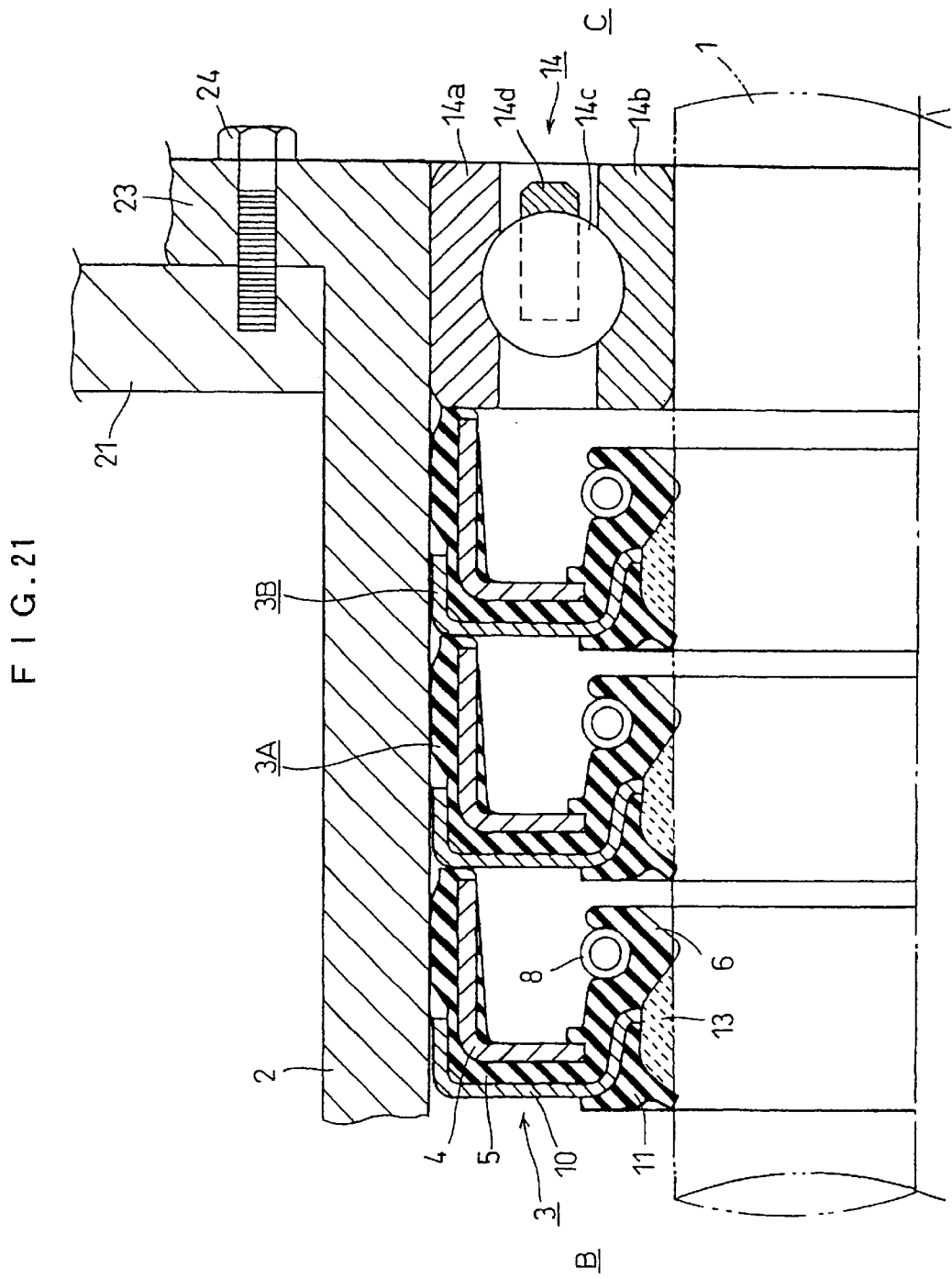
FIG. 21 is an enlarged, longitudinal sectional view of the upper half of another modification of a bearing unit according to Embodiment 20 of the present invention.

As Embodiment 20, a plurality of seals 3 may be arranged in axial direction as shown in FIG. 21. If a plurality of seals 3 (denoted by reference symbols 3, 3A and 3B) are arranged in axial direction, the pressure proof effect can be advantageously improved and sealing performance can be advantageously improved accordingly.

Figure 23:
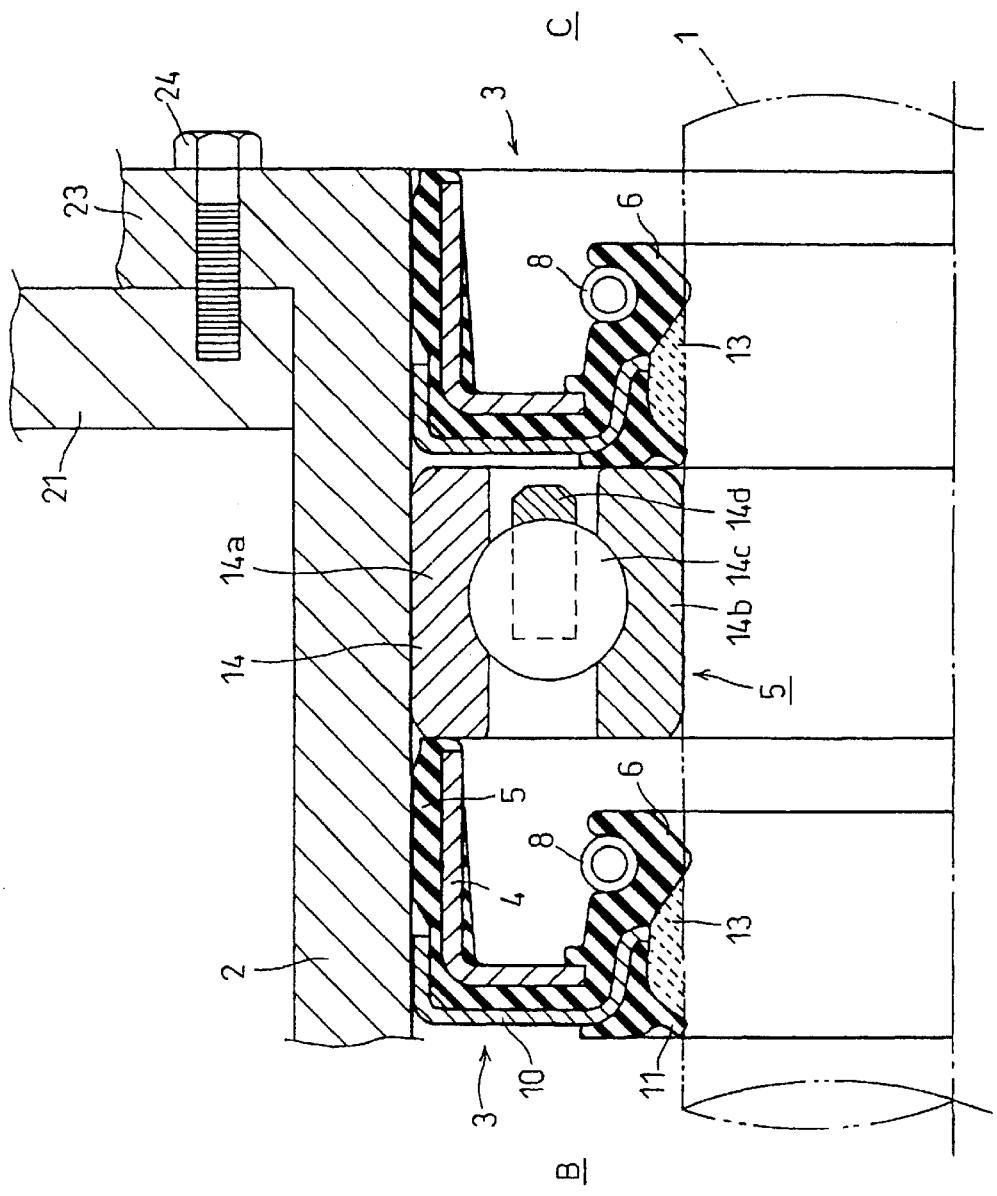
FIG. 23 is an enlarged, longitudinal sectional view of yet another modification of a bearing unit according to Embodiment 22 of the present invention.

In case of FIG. 23 to be described later, a plurality of seals 3 may be arranged on an atmospheric pressure space C side.

In Embodiment 20 stated above, no seal 3 is arranged in the rolling bearing 14. With such a structure, vacuum pressure is applied to one seal surfaces of the seals 3 and atmospheric pressure is applied to the other seal surfaces. As a result, excessive pressure difference is applied to the seals 3 themselves, which imposes a heavy burden on the structure to the disadvantageous of the lives of the seals.

Figure 22:
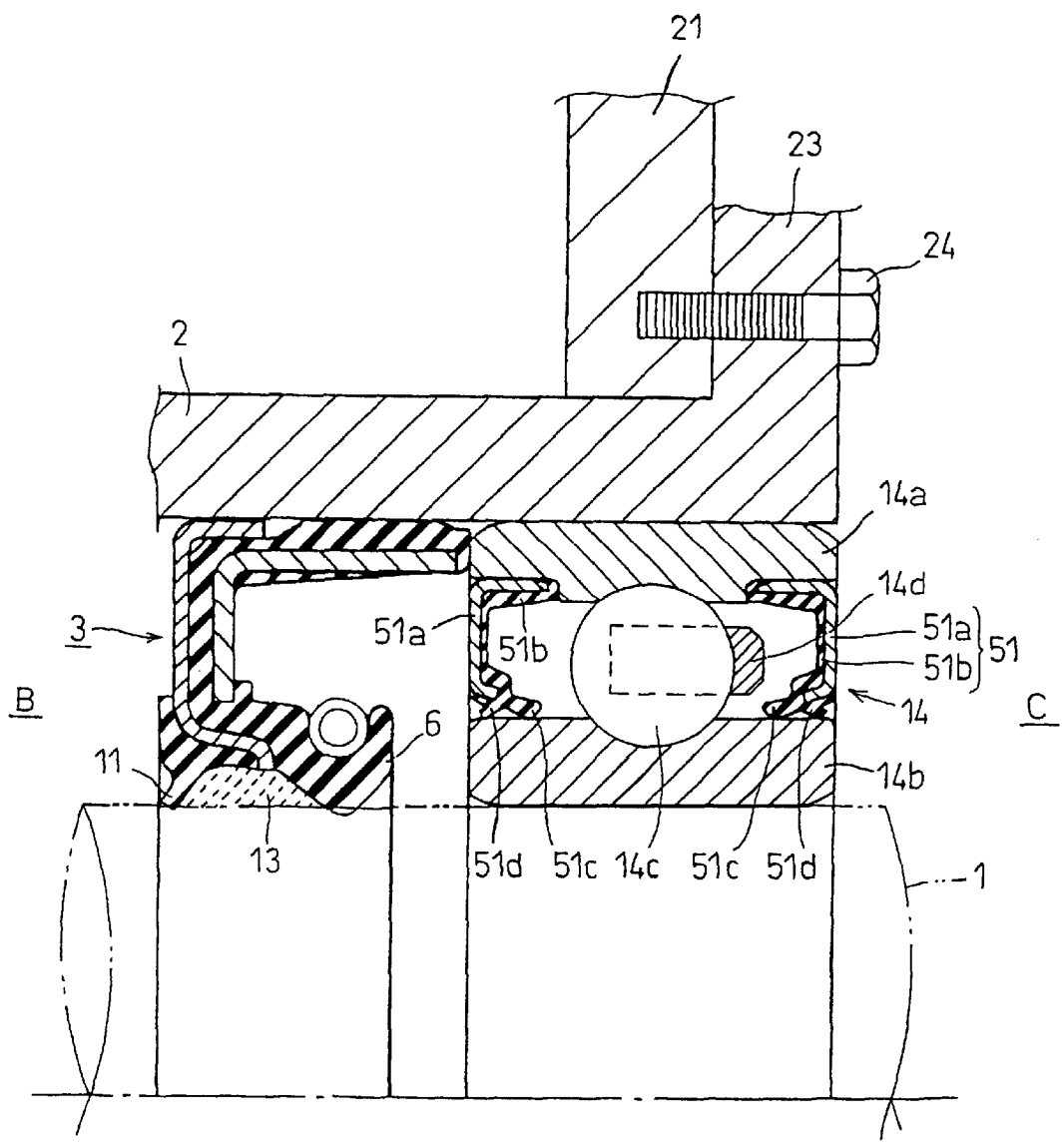
FIG. 22 is an enlarged, longitudinal sectional view of yet another modification of a bearing unit according to Embodiment 21 of the present invention.

Considering this, therefore, as Embodiment 21, an oil seal 51, for example, is arranged on a sealing target space B side between the inner and outer rings of the rolling baring 14 as shown in FIG. 22. Using this oil seal 51 as a pressure buffer, the pressure difference applied to the both sides of the seal 3 may be reduced to thereby realize the longer lives of the seals 3.

The oil seals 51 may be provided on not only the sealing target space B side but also an atmospheric pressure C side, thereby making the rolling bearing 14 itself sealed from both the sealing target space B side and the atmospheric pressure space C side.

The oil seal 51 has an elastic element 51b coated on an annular core metal 51a and a main lip 51c and an auxiliary lip 51d are formed on the inner peripheral-side end portion of the elastic element 5b.

Furthermore, since the seal 3 is arranged on the sealing target space B side which is outside of the rolling bearing 14, there is a probability that a lubricant leaks outside of the rolling bearing 14 despite a lubricant sealing action. Therefore, if the lubricant, not shown, in the rolling bearing 14 is prevented from leaking outside of the rolling bearing by using the oil seal 51 and the burden imposed on the pressure proof seal 3 to seal the lubricant is lessened, then the seal 3 can be used dedicatedly to proof resistance and a higher pressure proof effect can be obtained.

(10) In each of the above-stated Embodiments 19 to 21, the seal 3 is arranged only on the shaft end on the sealing target space A side of the rolling bearing 14. Alternatively, a pressure proof seal 3 in the same direction may be arranged on the shaft end on the atmospheric pressure space C side as Embodiment 22 as shown in FIG. 23.

If the seals 3 are arranged on the both shaft ends of the rolling bearing 14 as stated above, respectively, the rolling bearing 14 can be advantageously used to support the rotary shaft 1 in the vacuum chamber 21.

Furthermore, the probability of the leakage of a lubricant component within the rolling bearing 14 to the atmospheric pressure space C side can be advantageously reduced.

Moreover, if the seal 3 is provided only on one shaft end of the rolling bearing 14, excessive pressure difference is applied so as to partition the annular space into the sealing target space B in vacuum and the atmospheric pressure space C to thereby impose a heavier burden on the seal structure as in the case of the above-stated oil seal 51. In the embodiment shown in FIG. 23, by contrast, the seal 3 provided on the other shaft end serves as a pressure buffer to thereby reduce the pressure difference exerted to the seal 3 on one shaft end, thus making the lives of the seals 3 longer.

In the above-stated embodiment, a bearing unit constituted such that the seals 3 are provided externally of the rolling bearing 14 is provided and no seal 3 is arranged in the rolling bearing 14.

With the constitution of such a bearing unit, the seals 3 can be made large in size, so that a pressure proof seal structure ensuring a high pressure proof effect can be provided.

However, there are cases where such a high pressure proof effect is not required.

In those cases as Embodiment 23 shown in FIG. 24, a seal 3 may be arranged in the rolling bearing 14, i.e., on a sealing target space B side between the inner and outer rings 14a and 14b of the rolling bearing 14. By thus arranging the seal 3, one space, i.e., the sealing target space B for putting the seal 3 between the spaces in the rolling bearing 14 is sealed from the other space, i.e., the atmospheric pressure space C by the seal 3. In that case, if another seal 3 is arranged on the atmospheric pressure space C side, the rolling bearing 14 itself becomes a sealed type, whereby the interior of the rolling bearing 14 is sealed from both the sealing target space B and the atmospheric pressure space C. Accordingly, the sealing target space B is sealed from the atmospheric pressure space C through the rolling bearing 14, thereby further improving sealing performance.

In that case, the seals 3 become smaller in size. However, only the rolling bearing 14 can serve as a rotation introducing machine 22, thereby making the structure the rotation introducing machine more compact.

Furthermore, if the seal 3 is arranged in the rolling bearing 14 as shown in FIG. 24, the sealing target space B-side shaft end faces of the inner and outer rings of the bearing onto which no antioxidant oil is applied, directly face the sealing target space B to be put under an oxidization atmosphere.

Considering this, the inner and outer rings are constituted out of, for example, an anticorrosion material such as SUS440 C and the like, whereby it is possible to prevent even the inner and outer rings, onto which no antioxidant is applied, from being oxidized while the rolling bearing 14 having these inner and outer rings is assembled into the region in which the rotation introducing machine 22 is used.

As a result, even if the rolling bearing 14 having these inner and outer rings is installed in the sealing target space B, the interior of the sealing target space B is advantageously free from contamination.

While the seal 3 shown in FIG. 24 is constituted such that the elastic element 5 is coated on the annular core metal 4, the main lip 6 and the auxiliary lip 7 provided on the inner peripheral-side end portion of the elastic element 5 may be the same in shape as the conventional lips.

Needless to say, the auxiliary lip 7 of the seal 3 shown in FIG. 24 may be the same in shape as the auxiliary lip 7 shown in FIG. 1.

As Embodiment 24, surface treatment films 60 and 61 may be formed on the surfaces of the lips 6 and 7 and those of the rotary shaft 1, respectively as shown in FIG. 25.

The material of the surface treatment films 60 and 61 is selected from one of a group consisting of soft metal (gold, silver, copper and the like), fluorine-contained resins (polytetra fluoroethylene and the like) and DLC (or diamond like carbon corresponding to all carbon-contained materials having the intermediate property between a carbon sintered element including graphite and a diamond coat).

According to the seal having such surface treatment films 60 and 61 formed on the lips 6, 7 and the rotary shaft 1, respectively, even if each of the lips 6 and 7 slides on the rotary shaft 1 with the passage of time, the soft metal or the fluorine-contained resin acts as a lubricant per se. Besides, although being hard, the DLC film has excellent sliding characteristics, thereby decreasing the frequency with which the lips 6, 7 and the rotary shaft 1 damage mutual surfaces. As a result, no clearances are generated among the lips 6, 7 and the rotary shaft 1 and good sealing performance can be maintained. In addition, the soft metal and the fluorine-contained resin are soft, high in the adhesiveness to the lips 6, 7 and the rotary shaft 1 and, therefore, good in sealing performance. From this, it is possible to further improve the sealing performance of the seal, which seal is advantageously excellent in the holding of the sealing performance particularly in the above-stated specific environment.

In the above-stated embodiment, the surface treatment film 61 is formed on the surface of the rotary shaft 1. Alternatively, a film formation treatment may be conducted to the surface of the rotary shaft 1 using a manganese phosphate compound solution in the same manner as that stated above.

This manganese phosphate salt coat may be formed on at least the slide portion of the rotary shaft 1 with respect to the seal 3.

The surface treatment film 61 is formed on the surface of the rotary shaft 1 in the above-stated embodiment. Alternatively, a coat having lipophobic property (which is referred to as "a lipophobic coat") may be formed on the surface of the rotary shaft 1. The material of this coat is fluorine-contained lipophobic agent. The coat is coated on the surface of the rotary shaft 1.

As a result of this treatment, oil adheres to the surface of the rotary shaft 1 less easily (wettability deteriorates). This lipophobic coat also prevents an oil component within the rolling bearing 14 from leaking into the vacuum chamber 21 because of the lipophobic property thereof, thereby advantageously maintaining the chamber under a good atmosphere.

It is noted that this lipophobic coat is not necessarily formed on the entire surface of the rotary shaft 1. The coat may be formed on the slide portion of the rotary shaft 1 with respect to the seal 3 to the end portion thereof in the direction of the sealing target space B.

In this case, if the entry of not the lubricant oil used for the rolling bearing 14 but water into the vacuum chamber 21 is to be prevented, a lipophobic coat may be preferably formed on the surface of the rotary shaft 1.

Figure 26:
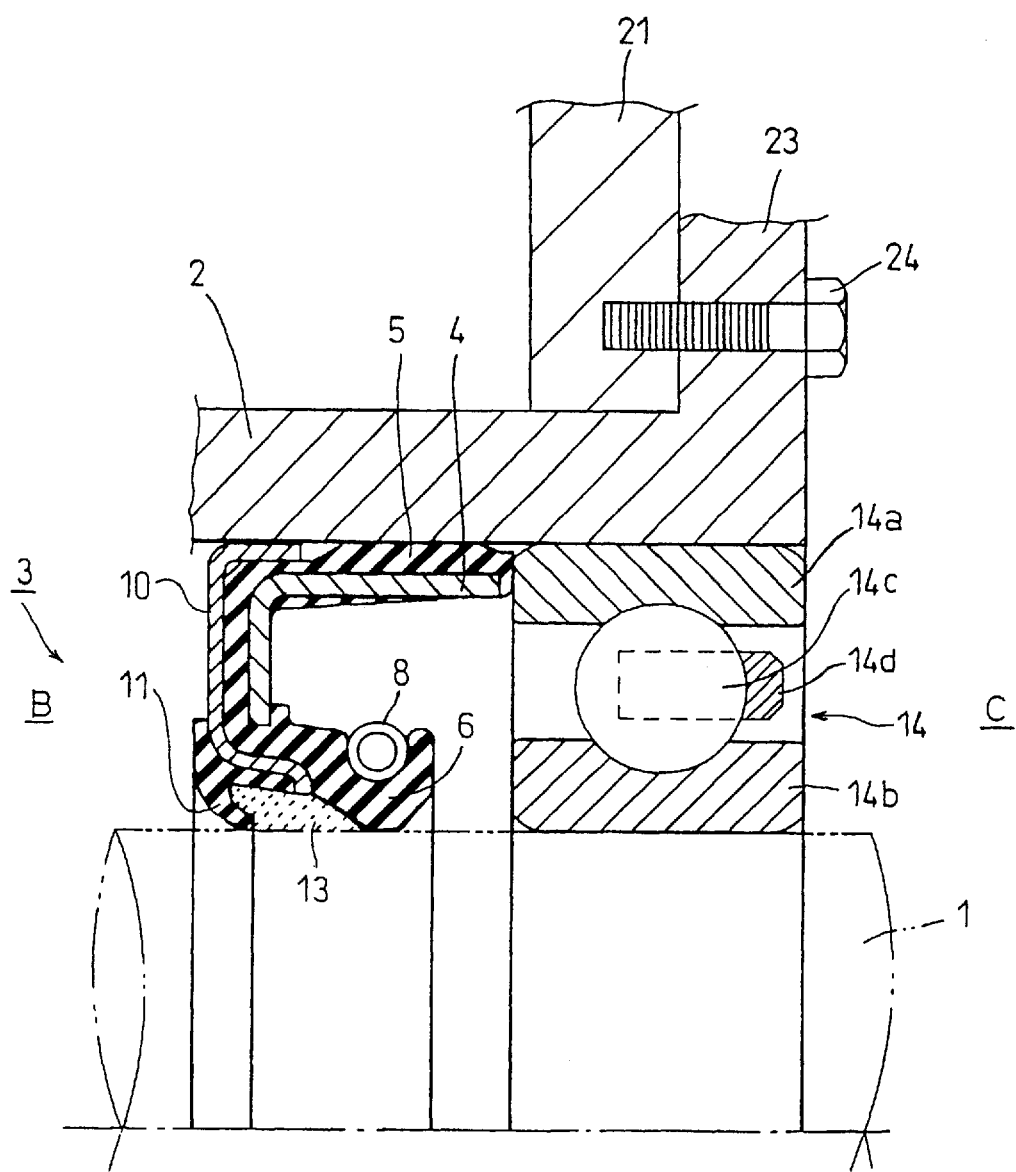
FIG. 26 is an enlarged, longitudinal sectional view of the upper half of yet another modification of a bearing unit according to Embodiment 25 of the present invention.

As shown in FIG. 26 as Embodiment 25, the auxiliary lip 11 may be formed into a tapered shape having an upper half cross section having gradually reduced diameter toward the atmospheric pressure space C side.

A seal according to the present invention axially partitions an annular space, in which two members face each other, the two members arranged concentrically inside and outside of the annular space in diameter direction, respectively into a low pressure space and a high pressure space having higher pressure than that of the low pressure space, and can be appropriately utilized to improve the sealing performance of the seal under a specific environment.

What is claimed is:

1. A seal arrangement comprising:
   a rotary member;
   a chamber having a fixed member disposed about said rotary member;
   said chamber defining a vacuum space where the pressure is equal to or less than $10^{-4}$ Pa;
   said chamber being disposed in an atmosphere space at atmospheric pressure;
   a seal member providing a seal interface between the rotary member and the fixed member;
   said seal having a lip;
   said lip for sealing one of a clearance and a sealed portion between the rotary member and the seal;
   said lip including a main lip and an auxiliary lip;
   a cross-sectional shape of an upper half of said main lip being a generally triangular shape directed toward a rotary member side and having the axial contact width gradually reduced;
   an axial contact width of said main lip W0 with respect to the rotary member being within a range of 0.2 mm$\leq$W0$\leq$2.0 mm;
   the main lip being adjacent the atmosphere space;
   the auxiliary lip being adjacent the vacuum space;
   said lip being constituted to be coated on an annular core metal attached to the fixed member, and an inner peripheral portion of the lip including an elastic element sliding on and contacting with the rotary member; and
   a hardness of a slide-contact portion of said lip with respect to the rotary member being set at a durometer hardness of 30 to 90,
   wherein said main lip has the axial contact width equal to or larger than a width necessary to secure minimum sealing performance with respect to said sealed portion and equal to or smaller than a width with which sliding resistance against the rotary member becomes a permissible upper limit so that a gaseous seal is provided between the vacuum space and the atmosphere space.

2. A seal according to claim 1, wherein
an inside diameter-side vertex portion of said lip is formed to be round.

3. A seal according to claim 1, wherein
the lip is bent from a root side to an inside diameter side, whereby a low pressure space-side slant face of the lip contacts with the rotary member.

4. A seal according to claim 1, wherein
an interference of said lip with respect to the rotary member is managed to hold said axial contact width.

5. A seal according to claim 1, wherein
a fastening force of said lip with respect to the rotary member is managed to hold said axial contact width.

6. A seal according to claim 5, wherein
said lip is constituted out of a material having nitrogen gas permeability, the nitrogen gas permeability becoming equal to or lower than 3.225 (cm$^3$/m$^2$/25 $\mu$m/24 h/25° C. atm).

7. A seal according to claim 1, wherein
a material of said lip is fluorine-contained rubber.

8. A seal according to claim 1, wherein
a material of said lip is fluorine-contained resin.

9. A seal according to claim 1, wherein a hardness of said elastic element is set at said durometer hardness.

10. A seal according to claim 1, wherein
said main lip and said auxiliary lip provided on a high pressure space side and a low pressure space side, respectively, to be away from each other in axial direction, a lubricant filled between the main lip and the auxiliary lip; and
said main lip has said width as the axial contact width with respect to the rotary member.

11. A seal according to claim 10, wherein
each of said main lip and said auxiliary lip has such a shape as to increase contact pressure by pressure acting from the high pressure space side to the low pressure space side.

12. A seal according to claim 10, wherein
said lubricant is a solid lubricant.

13. A seal according to claim 10, wherein
said lubricant is a lubricant having low vapor pressure.

14. A seal according to claim 1, wherein
a lubricating film is formed on a surface of said lip.

15. A seal according to claim 14, wherein
said lubricating film is a film formed out of one of soft metal, fluorine-contained resin and DLC.

16. A rotational assembly comprising:
   a rotary member;
   a chamber having a fixed member disposed about said rotary member;
   said chamber defining a vacuum space where the pressure is equal to or less than $10^{-4}$ Pa;
   said chamber being disposed in an atmosphere space at atmospheric pressure;

a seal member providing a sealing interface between the rotary member and the fixed member;

said seal having a lip;

said lip sealing one of a clearance and a sealed portion between the rotary member and the seal;

said lip including a main lip and an auxiliary lip;

a cross-sectional shape of an upper half of said main lip being a generally triangular shape directed toward a rotary member side and having the axial contact width gradually reduced;

the main lip being adjacent the atmosphere space;

the auxiliary lip being adjacent the vacuum space;

said lip being constituted to be coated on an annular core metal attached to the fixed member, and an inner peripheral portion of the lip including an elastic element sliding on and contacting with the rotary member; and a hardness of a slide-contact portion of said lip with respect to the rotary member being set at a durometer hardness of 30 to 90, wherein said rotary member is provided concentrically with a fixed member in diameter direction;

said seal is arranged in a space, said rotary member and said fixed member facing each other in the space, and provided with a lip for sealing one of a clearance and a sealed portion between said seal and the rotary member, an axial contact width of the lip with respect to the rotary member being equal to or larger than a width necessary to secure minimum sealing performance with respect to said sealed portion and being equal to or smaller than a width with which sliding resistance against the rotary shaft becomes a permissible upper limit, said axial contact width satisfying the following equation when the axial contact width is W0:

$$0.5 \text{ mm} \leq W0 \leq 2.0 \text{ mm}.$$

17. A rotational assembly according to claim 16, wherein a lubricating film is formed on a surface of said rotary member.

18. A rotational assembly according to claim 17, wherein said lubricating film is a film formed out of one of soft metal, fluorine-contained resin and DLC.

19. A rotational assembly according to claim 17, wherein said lubricating film is a film formed by a film formation treatment using a manganese phosphate salt compound solution.

20. A rotational assembly according to claim 17, wherein said lubricating film is a film having lipophobic property.

21. A seal arrangement comprising:

a rotary member;

a chamber having fixed member disposed about said rotary member;

said chamber defining a vacuum space where the pressure is equal or less than $10^{-4}$ Pa;

said chamber disposed in a high pressure space having higher pressure than pressure of the vacuum space;

a seal member providing a sealing interface between the rotary member and the fixed member;

said seal having a lip;

said lip for sealing one of a clearance and a sealed portion between the seal and the rotary member so that a gaseous seal is provided between the vacuum space and the high pressure space;

said lip including a main lip and an auxiliary lip;

a cross-sectional shape of an upper half of said main lip being a generally triangular shape directed toward a rotary member side and having the axial contact width gradually reduced;

an axial contact width of said main lip W0 with respect to the rotary member being within a range of 0.2 mm $\leq$ W0 $\leq$ 2.0 mm;

the main lip being adjacent the high pressure space;

the auxiliary lip being adjacent the vacuum space;

said lip being constituted to be coated on an annular core metal attached to the fixed member, and an inner peripheral portion of the lip including an elastic element sliding on and contacting with the rotary member; and a hardness of a slide-contact portion of said lip with respect to the rotary member being set at a durometer hardness of 30 to 90, wherein a lubricant is filled between the main lip and the auxiliary lip; and said main lip has the axial contact equal to or larger than a width necessary to secure minimum sealing performance with respect to said sealed portion and equal to or smaller than a width with which sliding resistance against the rotary member becomes a permissible upper limit, and has a slide-contact portion with respect to the rotary member.

22. A seal arranged arrangement comprising:

a rotary member;

a chamber having a fixed member disposed about said rotary member;

said chamber defining a low pressure space where the pressure is equal to or less than $10^{-4}$ Pa;

said chamber disposed in a high pressure space having higher pressure than pressure of the low pressure space;

a seal member providing a sealing interface between the rotary member and the fixed member;

said seal having a lip;

said lip for sealing one of a clearance and a sealed portion between the seal and the rotary member;

said lip including a main lip and an auxiliary lip;

a cross-sectional shape of an upper half of said main lip being a generally triangular shape directed toward a rotary member side and having the axial contact width gradually reduced;

an axial contact width of said main lip W0 with respect to the rotary member being within a range of 0.2 mm $\leq$ W0 $\leq$ 2.0 mm;

the main lip being adjacent the high pressure space;

the auxiliary lip being adjacent the low pressure space;

said lip being constituted to be coated on an annular core metal attached to the fixed member, and an inner peripheral portion of the lip including an elastic element sliding on and contacting with the rotary member; and a hardness of a slide-contact portion of said lip with respect to the rotary member being set at a durometer hardness of 30 to 90, wherein said main lip has the axial contact width equal to or larger than a width necessary to secure minimum sealing performance with respect to said sealed portion and equal to or smaller than a width with which sliding resistance against the rotary member becomes a permissible upper limit; and a lubricating film is formed on a surface of said lip.

23. A seal arranged arrangement, comprising:

a rotary member;

a chamber having a fixed member disposed about said rotary member;

said chamber defining a low pressure space where the pressure is equal to or less than $10^{-4}$ Pa;

said chamber being disposed in a high pressure space having higher pressure than pressure of the low pressure space;

a seal member providing a sealing interface between the rotary member and the fixed member;

said seal having a lip;

said lip for sealing one of a clearance and a sealed portion between the rotary member and the seal, said lip including a main lip and an auxiliary lip;

a cross-sectional shape of an upper half of said main lip being a generally triangular shape directed toward a rotary member side and having the axial contact width gradually reduced;

an axial contact width of said main lip W0 with respect to the rotary member being within a range of 0.2 mm$\leq$W0$\leq$2.0 mm;

the main lip being adjacent the high pressure space;

the auxiliary lip being adjacent the low pressure space;

said lip being constituted to be coated on an annular core metal attached to the fixed member, and an inner peripheral portion of the lip including an elastic element sliding on and contacting with the rotary member; and a hardness of a slide-contact portion of said lip with respect to the rotary member being set at a durometer hardness of 30 to 90, wherein said main lip has the axial contact width equal to or larger than a width necessary to secure minimum sealing performance with respect to said sealed portion and equal to or smaller than a width with which sliding resistance against the rotary member becomes a permissible upper limit.

* * * * *